(12) United States Patent
Nagata et al.

(10) Patent No.: US 12,058,478 B2
(45) Date of Patent: Aug. 6, 2024

(54) PROJECTION TYPE VIDEO DISPLAY DEVICE

(71) Applicant: Maxell, Ltd., Kyoto (JP)

(72) Inventors: Eriko Nagata, Kyoto (JP); Naoya Oka, Kyoto (JP); Kenichi Iwahara, Kyoto (JP)

(73) Assignee: MAXELL, LTD., Kyoto (JP)

( * ) Notice: Subject to any disclaimer, the term of this patent is extended or adjusted under 35 U.S.C. 154(b) by 486 days.

(21) Appl. No.: 17/421,212

(22) PCT Filed: Jan. 8, 2019

(86) PCT No.: PCT/JP2019/000244
§ 371 (c)(1),
(2) Date: Jul. 7, 2021

(87) PCT Pub. No.: WO2020/144744
PCT Pub. Date: Jul. 16, 2020

(65) Prior Publication Data
US 2022/0070421 A1    Mar. 3, 2022

(51) Int. Cl.
*H04N 9/31* (2006.01)
*G03B 21/20* (2006.01)

(52) U.S. Cl.
CPC ....... *H04N 9/3155* (2013.01); *G03B 21/2053* (2013.01); *H04N 9/3182* (2013.01)

(58) Field of Classification Search
CPC ................. H04N 9/31–3197; G03B 21/00–64
See application file for complete search history.

(56) References Cited

U.S. PATENT DOCUMENTS

2013/0141475 A1    6/2013   Kotani
2015/0269913 A1    9/2015   Wada
(Continued)

FOREIGN PATENT DOCUMENTS

JP    2013-117631 A    6/2013
JP    2014-072699 A    4/2014
(Continued)

OTHER PUBLICATIONS

International Search Report of PCT/JP2019/000244 dated Mar. 19, 2019.

*Primary Examiner* — Bao-Luan Q Le
*Assistant Examiner* — Christopher A Lamb, II
(74) *Attorney, Agent, or Firm* — Mattingly & Malur, PC

(57) ABSTRACT

A projection type video display apparatus is configured to include a projection optical system, an image processor, and a controller. The controller is configured to control the image processor to perform a blending process for partially changing the brightness of projection videos. The controller is configured to perform control to set a mode of the projection type video display apparatus to a blending adjustment mode in which a user adjusts the blending process performed by the image processor. In the blending adjustment mode, the controller is configured to perform control to generate a menu image of the blending adjustment menu and display the menu image in the projection video. In the blending adjustment mode, the controller automatically changes a display position of the blending adjustment menu according to a position of a blending adjustment region that is a region to be adjusted by the blending process.

7 Claims, 22 Drawing Sheets

(56) References Cited

U.S. PATENT DOCUMENTS

| | | | |
|---|---|---|---|
| 2016/0139869 A1* | 5/2016 | Ito .......................... | G09G 3/001 345/1.3 |
| 2016/0261819 A1* | 9/2016 | Mizushiro .............. | H04N 21/47 |
| 2017/0142382 A1 | 5/2017 | Nishioka | |

FOREIGN PATENT DOCUMENTS

| | | |
|---|---|---|
| JP | 2015-179940 A | 10/2015 |
| JP | 2016-57915 A | 4/2016 |

\* cited by examiner

| ADJUSTMENT REGION POSITION | ADJUSTMENT REGION WIDTH | ADJUSTMENT CURVE |
|---|---|---|
| ☑ UPPER SIDE | 0 ●——┃———●64 | -8●————┃●+8 |
| ☐ LOWER SIDE | 0 ●—┃————●64 | -8●————┃——●+8 |
| ☑ LEFT SIDE | 0 ●——┃———●64 | -8●————┃——●+8 |
| ☐ RIGHT SIDE | 0 ┃————————●64 | -8●————┃——●+8 |

BLENDING ADJUSTMENT MENU

MENU POSITION MANUAL CHANGE | TO REDUCED MENU | TO GENERAL MENU

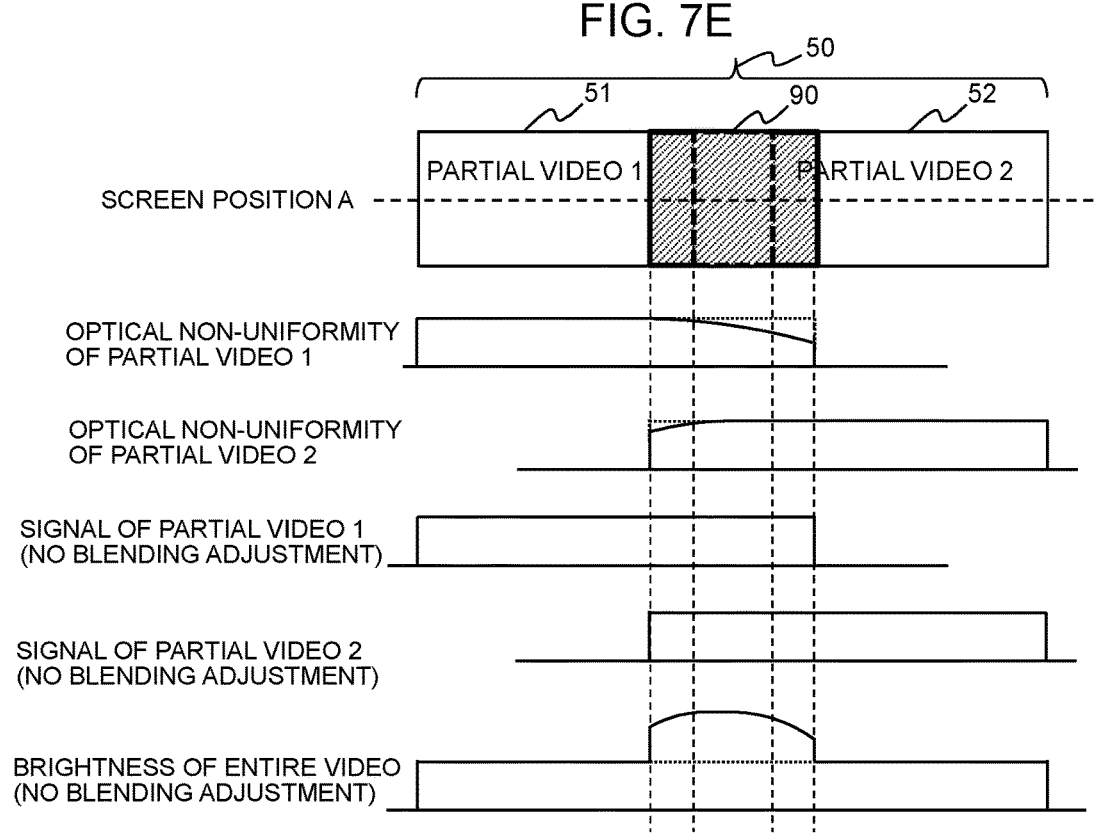
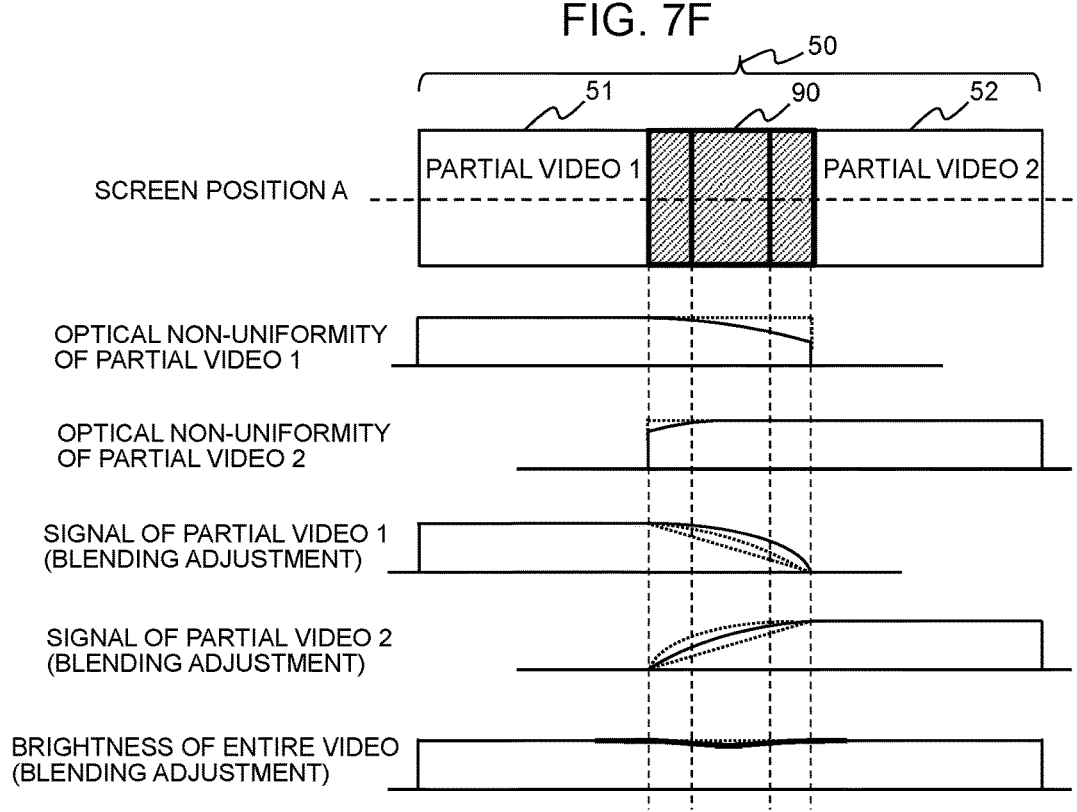

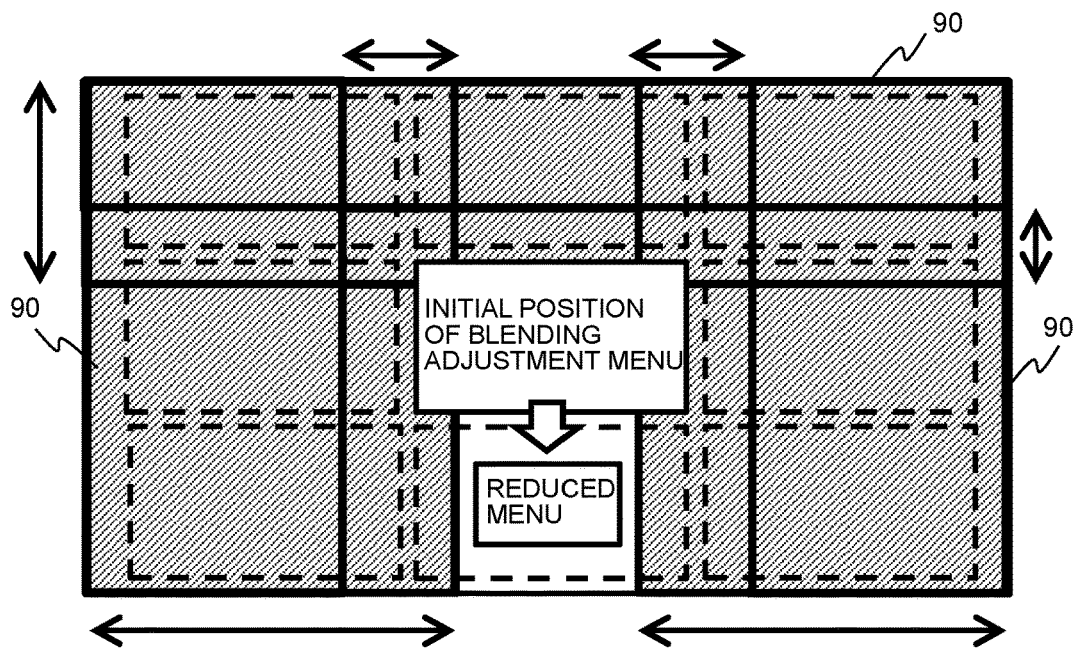

PROJECTION TYPE VIDEO DISPLAY DEVICE

TECHNICAL FIELD

The present invention relates to a video projection technique.

BACKGROUND ART

There is a video projection method in which videos are projected using a plurality of projection type video display apparatus and these videos are combined to display a large entire video. This may be referred to as, for example, multi-screen projection. Blending adjustment is known in which, when performing such multi-screen projection, regions of parts of projection videos of a plurality of projection type video display apparatus are made to overlap each other and the projection brightness and the like of the overlapping region are adjusted.

Patent Document 1 is a background art in this technical field. Patent Document 1 discloses a technique in which, in a projection apparatus that performs an edge blending process for multi-projection, it is determined whether or not the display position of a menu image changed by the user and an overlapping region overlap each other and a warning image is displayed in a projection video on the screen or the display position of the menu image is moved to a position that does not overlap the overlapping region.

CITATION LIST

Patent Document

Patent Document 1: JP 2015-179940 A

SUMMARY OF THE INVENTION

Problems to be Solved by the Invention

Patent Document 1 discloses only processing based on determination regarding whether or not the display position of the menu image changed by the user and the overlapping region overlap each other, and there is no disclosure about processing when the user does not change the display position of the menu image.

In addition, Patent Document 1 does not disclose at all a technique for adjusting the blending process on the edges of the projection videos, the display of a menu image for adjusting the blending process, and the like.

Therefore, the technical idea disclosed in Patent Document 1 has a problem that it is not configured to be said that the blending process on the edges of the projection videos is sufficiently performed more appropriately by the user.

Therefore, it is an object of the present invention to provide a video projection technique allowing a user to perform a blending process on the edges of projection videos more appropriately.

Solutions to Problems

In view of the aforementioned background art and problems, an example of the present invention is given. A projection type video display apparatus includes: a projection optical system configured to project a projection video based on a video displayed by a display element; an image processor; and a controller. In order to combine the projection video with a projection video of another projection type video display apparatus, the controller is configured to control the image processor to perform a blending process for partially changing brightnesses of the projection videos. The controller is configured to perform control to set a mode of the projection type video display apparatus to a blending adjustment mode in which a user adjusts the blending process performed by the image processor. In the blending adjustment mode, the controller is configured to perform control to generate a menu image of the blending adjustment menu and display the menu image in the projection video. In the blending adjustment mode, the controller automatically changes a display position of the blending adjustment menu according to a position of a blending adjustment region that is a region to be adjusted by the blending process.

Effects of the Invention

According to the present invention, it is possible to provide a video projection technique allowing a user to perform a blending process on the edges of projection videos more appropriately.

BRIEF DESCRIPTION OF THE DRAWINGS

FIG. 7E is an example in the case of using a blending adjustment region with a larger width in FIG. 7C.

FIG. 7F is an example showing a case where blending adjustment is performed in FIG. 7E.

FIG. 17B is a diagram describing the automatic display setting of the blending adjustment menu when the width of the blending adjustment region is changed in the fourth embodiment.

FIG. 18 is an example of a reduced menu of the blending adjustment menu in the fourth embodiment.

MODE FOR CARRYING OUT THE INVENTION

Hereinafter, embodiments of the present invention will be described with reference to the diagrams.

First Embodiment

Figure 1:
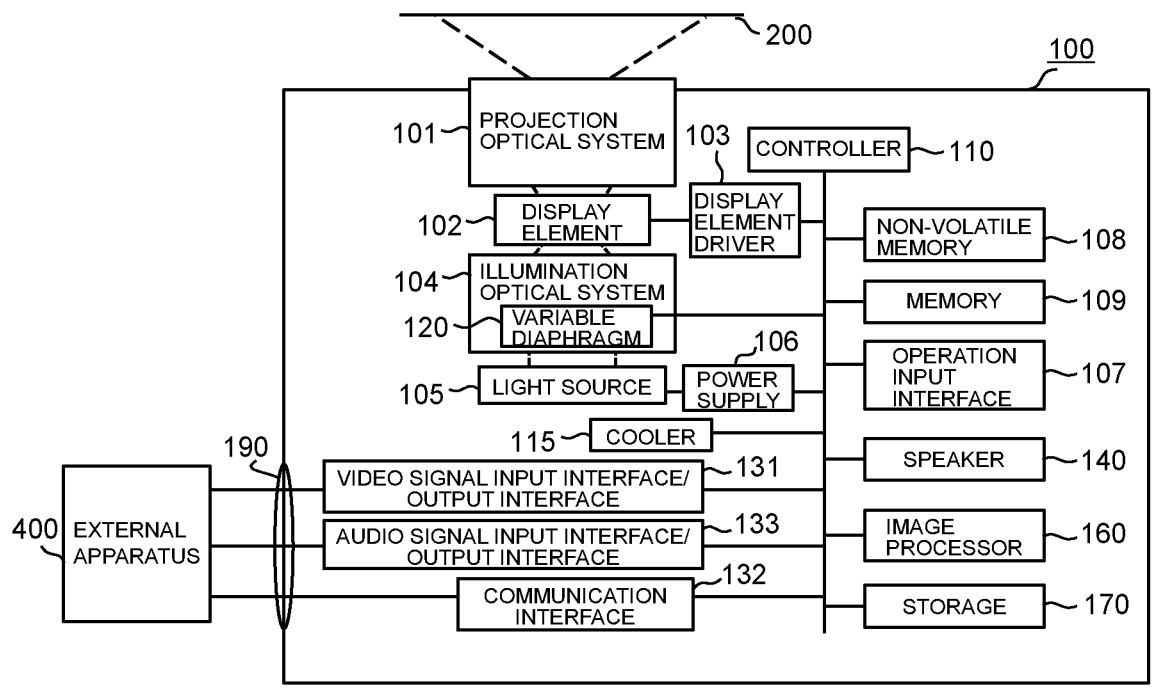
FIG. 1 is a block configuration diagram of a projection type video display apparatus according to a first embodiment.

FIG. 1 is a block configuration diagram of a projection type video display apparatus according to the present embodiment. In FIG. 1, a projection type video display apparatus 100 includes a projection optical system 101, a display element 102, a display element driver 103, an illumination optical system 104, a light source 105, a power supply 106, an operation input interface 107, a non-volatile memory 108, a memory 109, and a controller 110. In addition, the projection type video display apparatus 100 includes a cooler 115, a video signal input interface/output interface 131, a communication interface 132, an audio signal input interface/output interface 133, a speaker 140, an image processor 160, and a storage 170. The illumination optical system 104 includes a variable diaphragm 120.

The light source 105 generates light for video projection, and a high-pressure mercury lamp, a xenon lamp, an LED light source, a laser light source, or a combination thereof is used. The power supply 106 converts an AC current input from the outside into a DC current, and supplies electric power to the light source 105. In addition, the power supply 106 supplies the required DC current to each of the other interfaces. The illumination optical system 104 collects light generated by the light source 105, makes the light more uniform, and emits the light to the display element 102. The cooler 115 cools each interface in a high temperature state, such as the light source 105, the power supply 106, or the display element 102, by an air cooling method or a liquid cooling method as necessary.

The display element 102 is an element that transmits or reflects light from the illumination optical system 104 and modulates the light at that time to generate an image. For example, a transmissive liquid crystal panel, a reflective liquid crystal panel, and a DMD (Digital Micromirror Apparatus: registered trademark) panel are used. The display element driver 103 transmits a drive signal corresponding to the video signal to the display element 102.

The projection optical system 101 is a magnifying projection optical system that projects a video onto a display surface 200, and includes a lens and/or a mirror.

Here, the video signal referred to by the display element driver 103 may be an input video signal that is input from the outside through the video signal input interface/output interface 131, or may be a video signal obtained by performing image processing on the input video signal by the image processor 160, or a signal obtained by superimposing an OSD image signal, which is generated by the controller 110 using images stored in the non-volatile memory 108 or the storage 170, on these video signals may be referred to. An optical image generated by modulation of light by the display element 102 according to the drive signal, which is generated by the display element driver 103 with reference to these input video signals, is projected onto the display surface 200 as a display image by the projection optical system 101.

The operation input interface 107 is an operation button or a light receiver of a remote control, and receives an operation signal from the user.

The speaker 140 is configured to perform audio output based on audio data input to the audio signal input interface/output interface 133. In addition, the speaker 140 may output a built-in operation sound or an error warning sound.

Next, an interface 190 will be described. The interface 190 is an interface that connects the projection type video display apparatus 100 and an external apparatus 400 (for example, a video and audio output/input apparatus, an information processing apparatus, or another projection type video display apparatus) to each other to transmit and receive various kinds of data therebetween.

The video signal input interface/output interface 131 is a functional interface that configures a part of the interface 190, and inputs video data to the projection type video display apparatus 100 from the external apparatus 400 connected by the interface 190. The same interface may have a function of outputting video data. That is, the video signal input interface/output interface 131 is a separate or integrated functional interface, and functions as a video input interface for inputting a video and functions as a video output interface for outputting a video.

The audio signal input interface/output interface 133 receives audio data from the external apparatus (for example, an audio output/input apparatus or an information processing apparatus) 400 similarly connected by the interface 190. The same interface may have a function of outputting audio data. That is, the audio signal input interface/output interface 133 is a separate or integrated functional interface, and functions as an audio input interface for inputting an audio and functions as an audio output interface for outputting an audio.

The communication interface 132 receives and outputs various control signals from and to the external apparatus 400 similarly connected by the interface 190.

In addition, although the video signal input interface/output interface 131, the audio signal input interface/output interface 133, and the communication interface 132 are configured as the same interface 190, these may be configured as separate interfaces.

The non-volatile memory 108 stores various kinds of data used in a projector function. The memory 109 stores video data to be projected or control data of the apparatus. Image data used to generate a GUI image may be stored. The controller 110 controls the operation of each connected interface.

The image processor 160 performs image processing on the video data input by the video signal input interface/output interface 131. Examples of the image processing include scaling processing for enlarging, reducing, and transforming an image, bright adjustment processing for changing brightness, contrast adjustment processing for changing the contrast curve of an image, gamma adjustment processing for changing the gamma curve indicating the gradation characteristics of an image, and retinex processing for decomposing an image into light components to change the weighting for each component. In addition, blending processing for partially changing the brightness, which will be described later, is also performed.

The storage 170 records videos, images, audio, various kinds of data, and the like. For example, videos, images, audio, various kinds of data, and the like may be recorded in advance at the time of product shipment, or videos, images, audio, various kinds of data, and the like acquired from an external apparatus, an external server, and the like through the communication interface 132 may be recorded. The videos, images, various kinds of data, and the like recorded in the storage 170 may be output as projection videos through the display element 102 and the projection optical system 101. The audio recorded in the storage 170 may be output as audio from the speaker 140.

The variable diaphragm 120 is, for example, a mechanism including a movable light shielding plate capable of blocking a part of the optical path of the illumination optical system 104. Under the control of the controller 110, the variable diaphragm 120 changes the amount of light shielding by changing (moving, rotating) the position or angle of the light shielding plate according to the dimming value (for example, a light shielding rate or the number of aperture steps) calculated based on the video input to the video signal input interface/output interface 131 or the dimming value (for example, a light shielding rate or the number of aperture steps) calculated based on the control signal received from the communication interface 132. The position or angle of the light shielding plate may be changed by changing the input voltage value with respect to the driver of the light shielding plate or by changing the number of pulses input to the driver of the light shielding plate.

Next, blending adjustment, which is the premise of the present embodiment, will be described. When performing multi-screen projection in which videos are projected using a plurality of projection type video display apparatus and these videos are combined to display a large entire video, regions of parts of the projection videos of the plurality of projection type video display apparatus are made to overlap each other and the projection brightness and the like of the overlapping region are adjusted to reduce the user's discomfort about the joint between the partial videos. This adjustment of the projection brightness and the like of the overlapping region is called blending adjustment.

Figure 2:
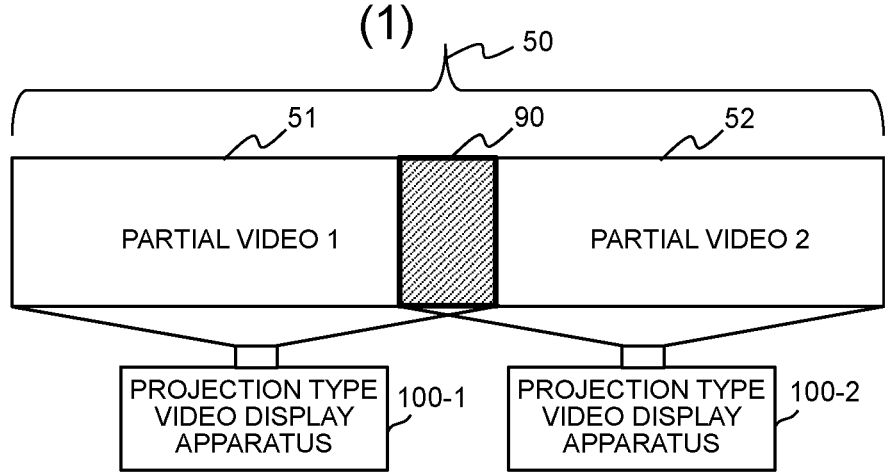
FIG. 2 is a diagram describing multi-screen projection by two projection type video display apparatus, which is the premise of the first embodiment.
Figure 2:
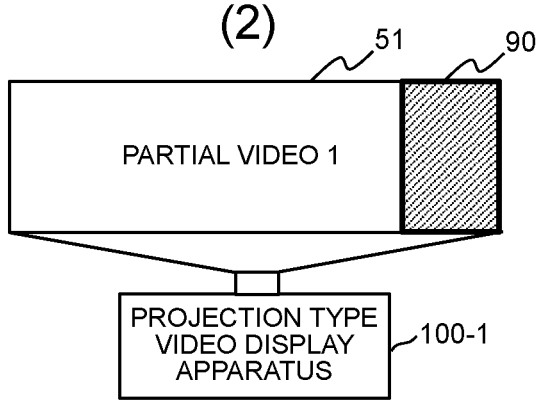
Figure 2:
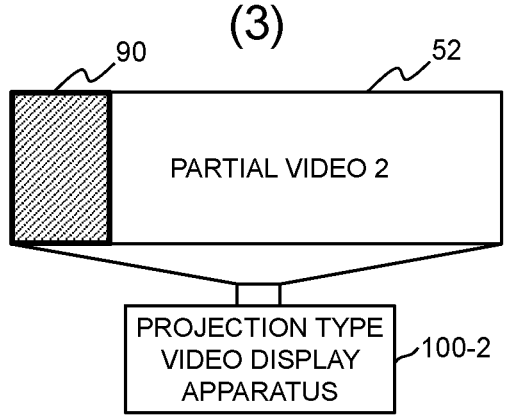

FIG. 2 is a diagram describing multi-screen projection by two projection type video display apparatus, which is the premise of the present embodiment. In FIG. 2, as shown in (1), when an entire video 50 is projected by two projection type video display apparatus 100-1 and 100-2, a region where the joints of a partial video 1 (51) and a partial video 2 (52), which are projection videos of the projection type video display apparatus, overlap each other is defined as a blending adjustment region 90.

In FIG. 2, (2) shows a display state focusing on the projection video of the projection type video display apparatus 100-1 alone that projects the partial video 1 (51) in the multi-screen projection state of (1). That is, as shown in (2), in the projection type video display apparatus 100-1, the blending adjustment region 90 is present on the right side of the projection video. In addition, (3) shows a display state focusing on the projection video of the projection type video display apparatus 100-2 alone that projects the partial video 2 (52) in the multi-screen projection state of (1). As shown in (3), in the projection type video display apparatus 100-2, the blending adjustment region 90 is present on the left side of the projection video.

Thus, in each of the projection type video display apparatus that project a partial video in multi-screen projection, a position where the blending adjustment region is to be set differs depending on where the partial video to be projected is arranged in the entire image.

Figure 3:
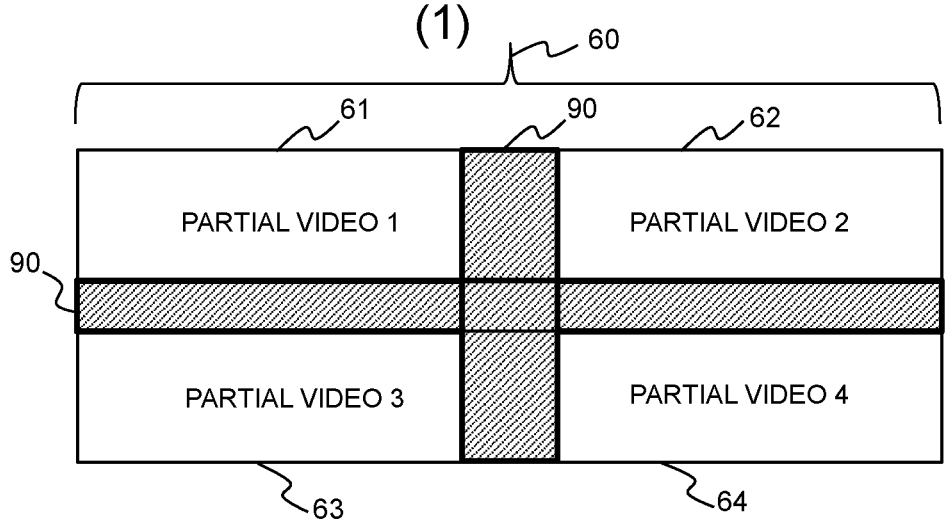
FIG. 3 is a diagram describing multi-screen projection by four projection type video display apparatus, which is the premise of the first embodiment.
Figure 3:
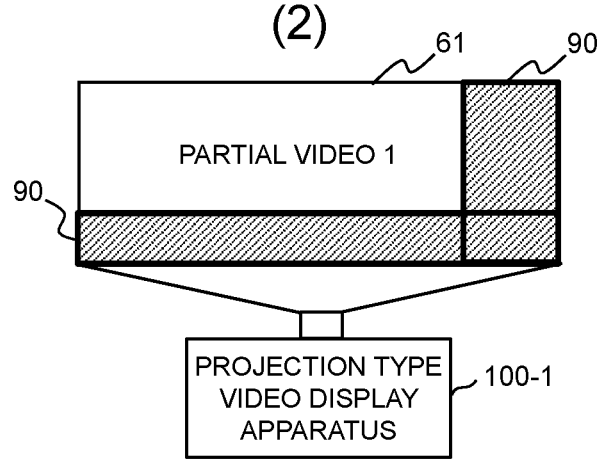
Figure 3:
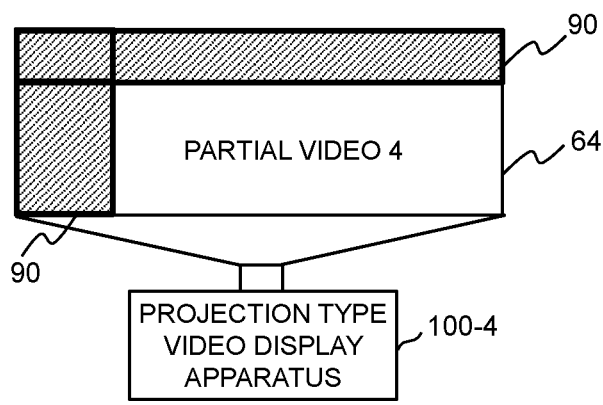

FIG. 3 is a diagram describing multi-screen projection by four projection type video display apparatus, which is the premise of the present embodiment. In FIG. 3, the projection type video display apparatus are not shown for the sake of simplicity. As shown in (1) of FIG. 3, in the case of multi-screen projection in which four partial videos are combined to display one entire video 60, the blending adjustment region 90 is present so as to extend in two directions.

In FIG. 3, (2) shows a display state focusing on the projection video of the projection type video display apparatus 100-1 alone that projects a partial video 1 (61) in the multi-screen projection state of (1). That is, in the projection type video display apparatus 100-1 that projects the partial video 1 (61), the blending adjustment region 90 is present so as to extend in two directions along the right side and the lower side edge of the projection video.

In addition, in FIG. 3, (3) shows a display state focusing on the projection video of a projection type video display apparatus 100-4 alone that projects a partial video 4 (64) in the multi-screen projection state of (1). As shown in (3), in the projection type video display apparatus 100-4 that projects the partial video 4 (64), the blending adjustment region 90 is present so as to extend in two directions along the left side and the upper side edge of the projection video.

Thus, it is necessary that the blending adjustment region in the partial video in the multi-screen projection is configured to be arranged so as to extend along each side not only up to one side but also up to two sides.

Figure 4:
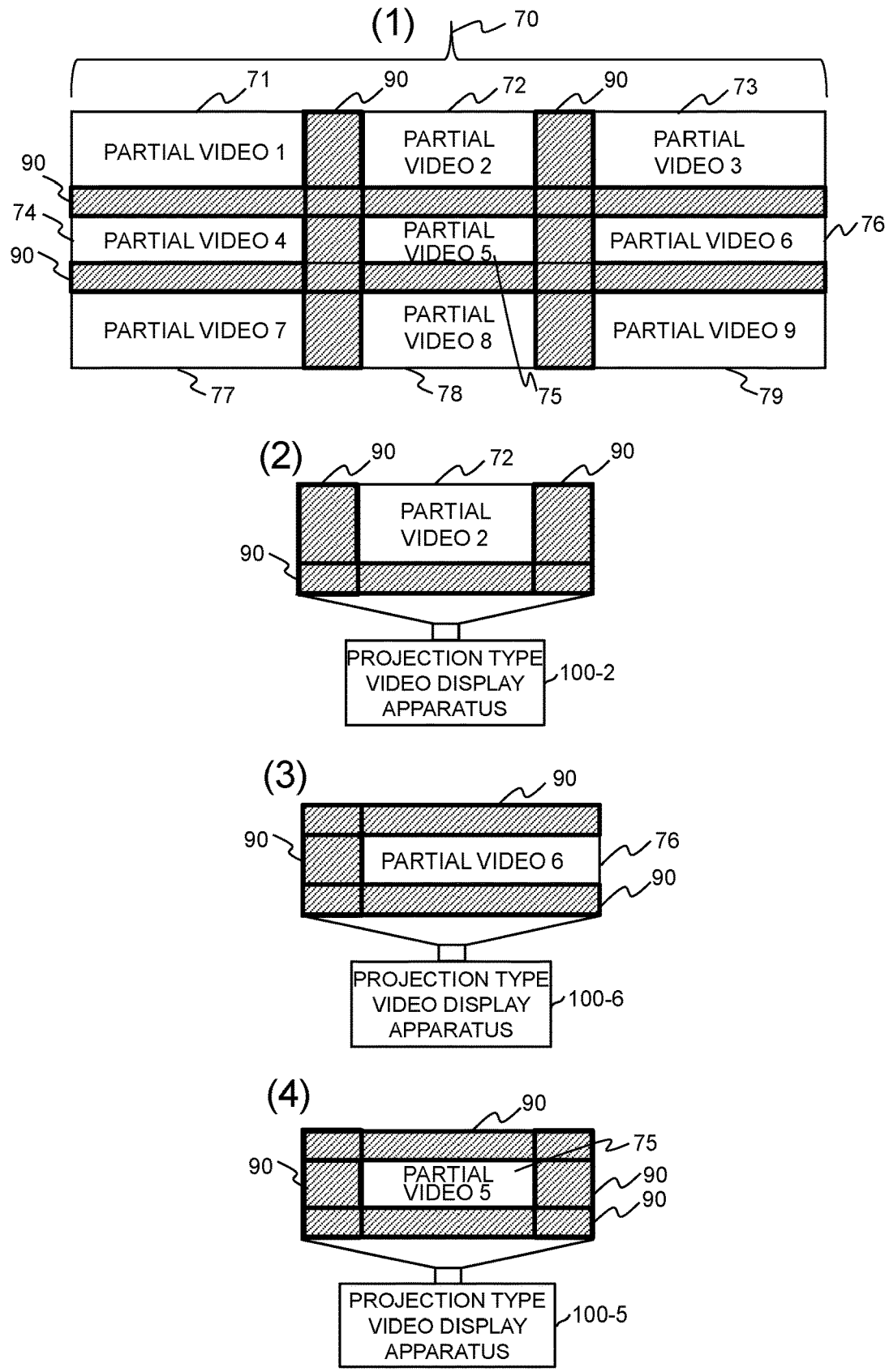
FIG. 4 is a diagram describing multi-screen projection by four projection type video display apparatus, which is the premise of the first embodiment.

FIG. 4 is a diagram describing multi-screen projection by nine projection type video display apparatus, which is the premise of the present embodiment. In FIG. 4, the projection type video display apparatus are not shown for the sake of simplicity. As shown in (1) of FIG. 4, in the case of multi-screen projection in which nine partial videos are combined to display one entire video 70, a plurality of rows of blending adjustment regions 90 extending in two directions are present.

In FIG. 4, (2) shows a display state focusing on the projection video of the projection type video display apparatus 100-2 alone that projects a partial video 2 (72) in the multi-screen projection state of (1). As shown in (2), in the projection type video display apparatus 100-2 that projects the partial video 2 (72), the blending adjustment region 90 is present at the left side edge, the lower side edge, and the right side edge of the projection video. That is, the blending adjustment region 90 is present along the three sides.

In addition, in FIG. 4, (3) shows a display state focusing on the projection video of a projection type video display apparatus 100-6 alone that projects a partial video 6 (76) in the multi-screen projection state of (1). That is, in the projection type video display apparatus 100-6 that projects the partial video 6 (76), the blending adjustment region 90 is present at the upper side edge, the lower side edge, and the left side edge of the projection video. That is, the blending adjustment region 90 is present along the three sides.

In addition, in FIG. 4, (4) shows a display state focusing on the projection video of a projection type video display apparatus 100-5 alone that projects a partial video 5 (75) in the multi-screen projection state of (1). That is, in the projection type video display apparatus 100-5 that projects the partial video 5 (75), the blending adjustment region 90 is present at the upper side edge, the lower side edge, the right side edge, and the left side edge of the projection video. That is, the blending adjustment region 90 is present along all of the four sides.

Thus, it is necessary that the blending adjustment region in the partial video in the multi-screen projection is configured to be arranged so as to extend along each side not only up to one side or two sides but also up to three sides and four sides.

The plurality of multi-screen projection examples described above are examples of use by a user of a projection type video display apparatus. As described above, in each of the projection type video display apparatus that project a partial video in multi-screen projection, a position where the blending adjustment region is to be set differs depending on where the partial video to be projected is arranged in the entire image. In addition, it is necessary that the blending adjustment region is configured to be arranged so as to extend along each side up to four sides.

It is desirable that the projection type video display apparatus is configured so as to be usable in various multi-screen projections. Therefore, it is desirable that, at each of the positions of a plurality of different blending adjustment regions, in other words, in various combinations of the blending adjustment regions on the four sides of the rectangle of the projection video, the projection type video display apparatus is configured such that the user is configured to appropriately arrange each blending adjustment region.

Figures 5, 6:
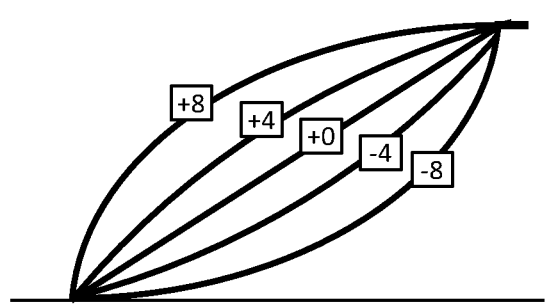
FIG. 5 is a display example of a blending adjustment menu which is the premise of the first embodiment.
FIG. 6 is an example of an index value of curve adjustment in the blending adjustment menu, which is the premise of the first embodiment.

Next, a blending adjustment menu for blending adjustment will be described. FIG. 5 is a display example of the blending adjustment menu which is the premise of the present embodiment.

In FIG. 5, items in the left column of the menu are items for selecting blending adjustment regions and a combination thereof. For example, in the example shown in the diagram, each side on which the user performs blending adjustment, among the four sides of the projection screen, is configured to be checked and selected. In this manner, the user is configured to select blending adjustment regions and a combination thereof.

Then, the items in the center column of the menu in FIG. 5 are items for selecting the width of the blending adjustment region. For example, in the example of the diagram, the width is configured to be selected for each of the blending adjustment regions corresponding to the four sides of the projection screen. The width may be displayed by the number of pixels, such as 100 pixels or 200 pixels, or may be displayed by some index value associated with the width on the screen. If the projection screen size is configured to be calculated, the actual width on the screen, for example, 20 cm or 40 cm, may be displayed. In the example of the diagram, selecting the width 0 means that no corresponding blending adjustment region is provided for that side. Instead of this, whether or not to provide the blending adjustment region for each side may be separately displayed on the menu as another selection item. In addition, the width of the blending adjustment region may be made common for the side on which the blending adjustment region is provided.

Then, the items in the right column of the menu in FIG. 5 are items for selecting the curvature of the curve of the blending adjustment region. When the curvature of the curve is configured to be selected, it is desirable to select index values associated with a plurality of curvatures since the specific curvature value is very small. A specific example is shown in FIG. 6.

In addition, a manual switching button to the Small Menu, which will be described later, may be provided. In addition, a manual switching button to the General Menu, which will be described later, may be provided. In addition, a button for switching to the manual position change mode of the blending menu, which will be described, may be provided. In the example of FIG. 5, the index value is selected with a slide bar.

FIG. 6 shows an example of the index value of the curve adjustment of the blending adjustment menu, which is the premise of the present embodiment. In addition, the details of the blending adjustment will be described with reference to FIGS. 7A to 7D.

Figure 7A:
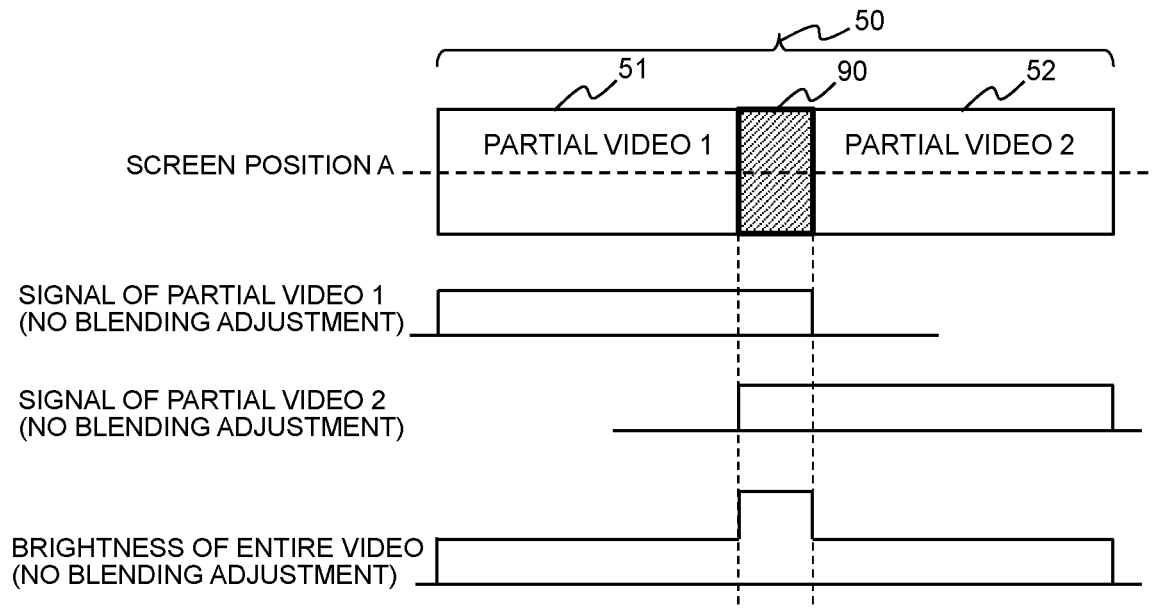
FIG. 7A is an example showing one state of a process of generating the entire video while making two partial videos overlap each other in a blending adjustment region using two projection type video display apparatus, which is the premise of the first embodiment.

FIG. 7A is an example showing one state of the process of generating the entire video 50 while making two partial videos overlap each other in a blending adjustment region using two projection type video display apparatus. FIG. 7A shows an example in which the brightnesses of the projection videos of the two projection type video display apparatus are ideally uniform. In addition, a state before the blending adjustment is shown. In FIG. 7A, the upper part shows the entire video 50 of the projection videos, and the level and brightness of a signal at a screen position A shown by the broken line are shown in the lower part for the partial video 1 (51), the partial video 2 (52), and the entire video 50. In FIG. 7A, in the blending adjustment region 90, the brightnesses of the partial video 1 (51) and the partial video 2 (52) are simply combined. Therefore, the brightness of the entire video is brightened only in the blending adjustment region, resulting in a video projection state causing a strong sense of discomfort.

Figure 7B:
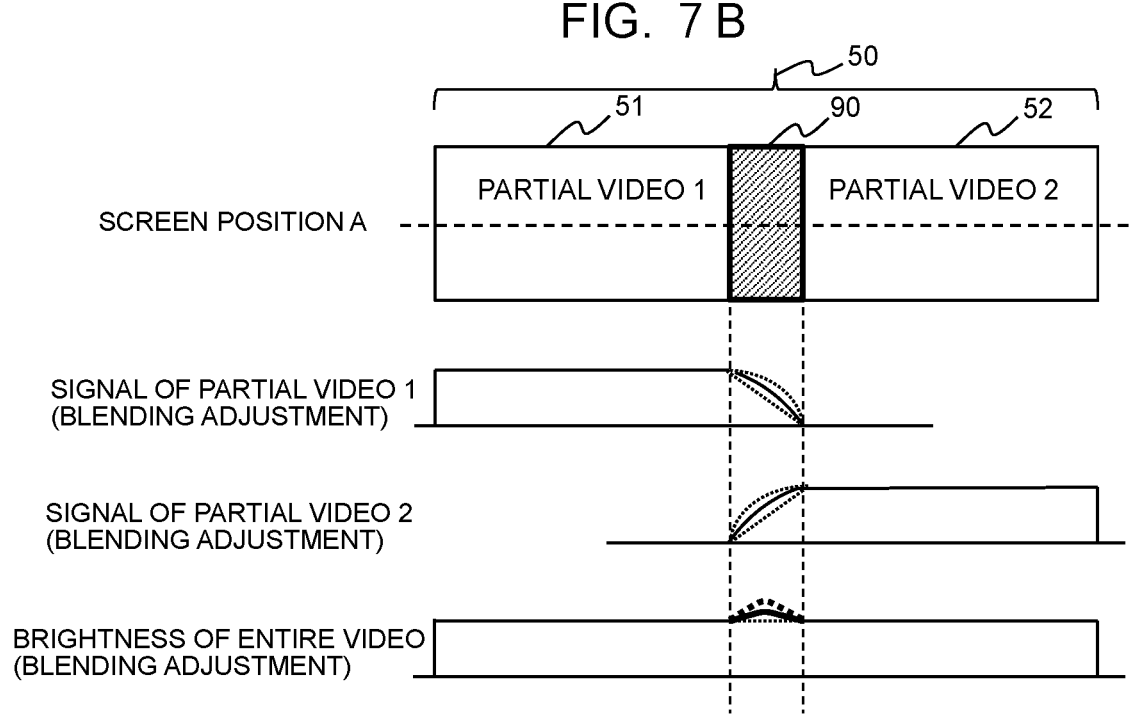
FIG. 7B is an example in which blending adjustment is performed in FIG. 7A.

FIG. 7B shows an example in which blending adjustment is performed in FIG. 7A. As shown in FIG. 7B, the target region of the blending adjustment, that is, a blending adjustment region is set according to the blending adjustment region, and the signal levels of the partial video 1 (51) and the partial video 2 (52) in the region are gently changed as shown in the diagram, so that it is possible to suppress an abrupt brightness change in the blending adjustment region of the entire video. As a result, it is possible to appropriately reduce the discomfort felt by the user in the blending adjustment region. It is desirable that the curvature of the change in each signal level of the partial video 1 (51) and the partial video 2 (52) in the blending adjustment region is configured to be changed by using the blending adjustment menu. In FIG. 7B, an example of variable curvature options is shown by using the dotted line. In addition, a blending process, which is the blending adjustment, is performed by the image processor 160.

Figure 7C:
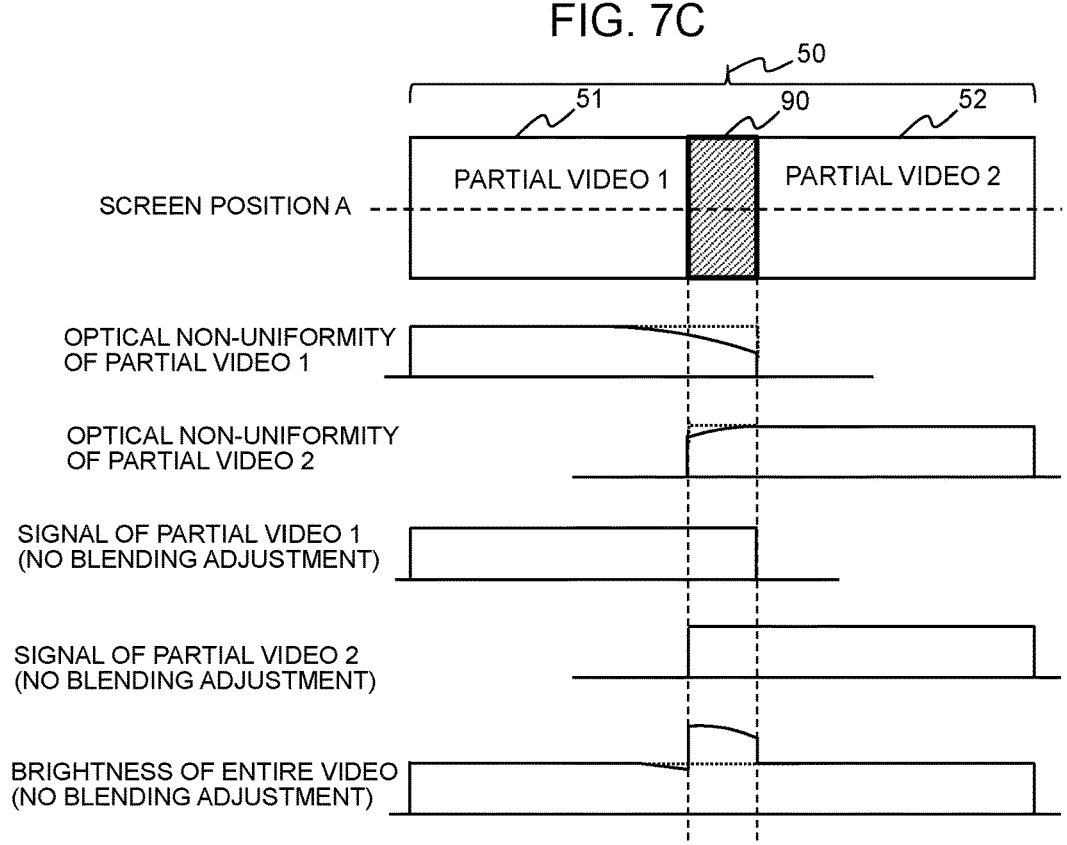
FIG. 7C is an example in which the non-uniformity of projection videos of the projection type video display apparatus due to optical factors is further taken into consideration in FIG. 7A.

FIG. 7C shows an example in which the non-uniformity of projection videos of the projection type video display apparatus due to optical factors is further taken into consideration in FIG. 7A. The brightness of the projection video of the projection type video display apparatus may not be kept uniform at the center of the screen and the edge of the screen depending on the elements or configurations of the projection optical system (projection lens or projection mirror) or the light source and the illumination optical system. The non-uniformity of the brightness is affected by the projection direction in the case of a projection optical system in which the projection direction of the projection video is configured to be changed. In addition, strictly speaking, this is also affected by individual differences in the projection type video display apparatus and changes due to the light source use time. FIG. 7C shows a state before blending adjustment in consideration of non-uniformity due to optical factors. Due to the non-uniformity of the brightness of the partial video 1 (51) and the partial video 2 (52) due to optical factors, asymmetrical brightness changes occur at the edges of the screen. Therefore, the brightness of the entire video in a state before the blending adjustment is performed is asymmetrical. In addition, since the blending adjustment is not performed, the brightness of the entire video is brightened only in the blending adjustment region, resulting in a video projection state causing a strong sense of discomfort.

Figure 7D:
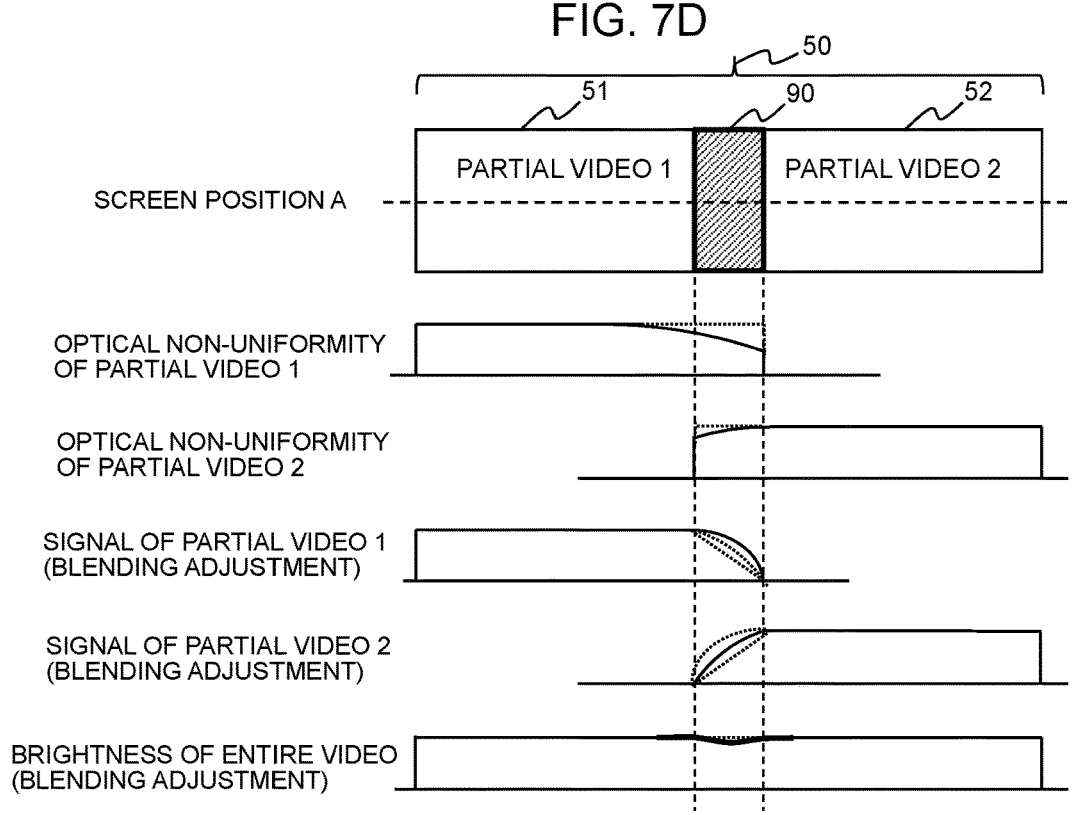
FIG. 7D is an example in which blending adjustment is performed in FIG. 7C.

FIG. 7D is an example in which blending adjustment is performed in FIG. 7C. In the video display apparatus according to the present embodiment, the curvature of the brightness change in the blending adjustment region is configured to be changed. Therefore, the change in the signal level in the blending adjustment of the respective video display apparatus corresponding to the partial video 1 (51) and the partial video 2 (52) may be adjusted according to the non-uniformity of the projection videos due to optical factors. As a result, even when asymmetrical brightness changes are caused by non-uniformity due to optical factors, an abrupt change in the brightness of the entire video in the blending adjustment region is configured to be more appropriately suppressed by individually adjusting the change in signal level in each blending adjustment of the plurality of video display apparatus. In addition, even when asymmetrical brightness changes are caused by non-uniformity due to optical factors, it is possible to more appropriately reduce the discomfort felt by the user in the blending adjustment region.

FIG. 7E is an example in the case of using a blending adjustment region with a larger width in FIG. 7C. The characteristics of the optical non-uniformity of the partial video 1 (51) and the optical non-uniformity of the partial video 2 (52) are the same as those in FIG. 7C, but the positions are different. The brightness of the entire video before the blending adjustment is performed is, for example, as shown in the diagram.

FIG. 7F is an example showing a case where blending adjustment is performed corresponding to FIG. 7E. In FIG. 7E, the overlapping width (width of the blending adjustment region) of the two partial videos in the blending adjustment region is larger than that in FIG. 7C. Correspondingly, in FIG. 7F, the width of the blending adjustment region is also larger than that in FIG. 7D. An abrupt change in the brightness of the blending adjustment region occurs at the edge of the blending adjustment region. Therefore, when the user desires to set the overlapping width of the partial videos (width of the blending adjustment region) to a desired width, it is also desirable that the width of the blending adjustment region is configured to be changed according to the desired width.

In this manner, it is possible to perform appropriate blending adjustment in the partial video 1 (51) and the partial video 2 (52). Therefore, since an abrupt change in the brightness of the entire video in the blending adjustment region is configured to be suppressed more appropriately, it is possible to more appropriately reduce the discomfort felt by the user in the blending adjustment region.

When changing the curvature as shown in FIGS. 7B, 7D, and 7F as described above, for example, the curvature of the curve and the index value may be associated with each other as shown in FIG. 6, so that the curve having a desired curvature is configured to be set by selecting the index value by the user. In addition, although the brightness adjustment has been described as the blending adjustment, the color may be adjusted.

Figure 8A:
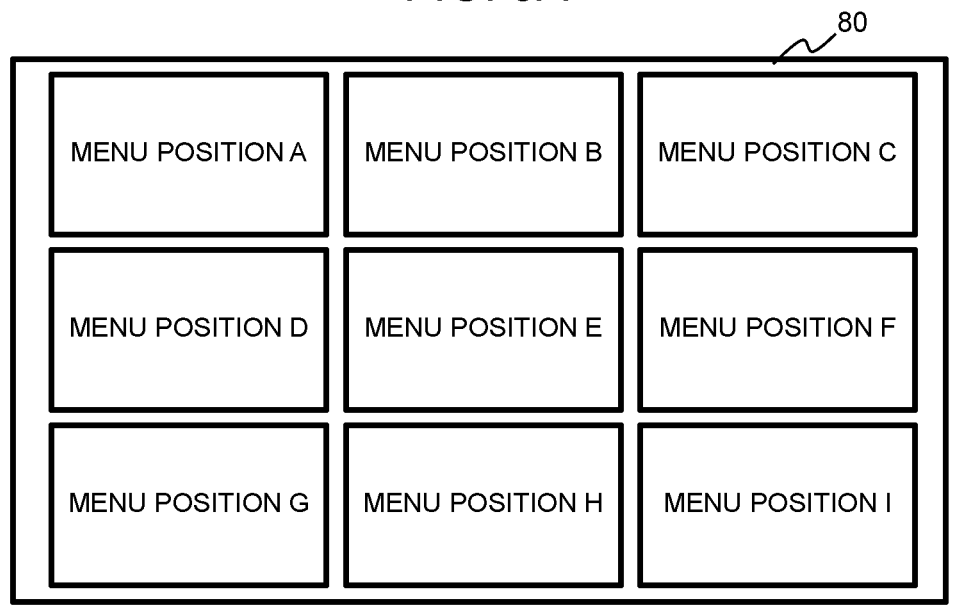
FIG. 8A is a diagram showing an example of the menu position on a projection screen.

Next, FIG. 8A shows an example of various menu positions for use in the description of the following embodiment. In FIG. 8A, for a projection screen 80 to be projected and displayed by one projection type video display apparatus, only nine typical positions are illustrated in order to simplify the description of the embodiment. In the actual configuration, it is desirable to make the resolution of the position adjustment higher so that the position between these nine positions is adjusted in multiple stages because this is more convenient for the user.

In FIG. 8A, a menu position A is near the upper left edge of the projection screen 80. A menu position B is the center of the screen in the horizontal direction of the screen and is near the upper side of the screen in the vertical direction of the screen. A menu position C is near the upper right edge of the screen. A menu position D is the center of the screen in the vertical direction of the screen and is near the left side of the screen in the horizontal direction of the screen. A menu position E is approximately the center position of the screen. A menu position F is the center of the screen in the vertical direction of the screen and is near the right side of the screen in the horizontal direction of the screen. A menu position G is near the lower left edge of the screen. A menu position H is the center of the screen in the horizontal direction of the screen and is near the lower side of the screen in the vertical direction of the screen. A menu position I is near the lower right edge of the screen.

Figure 8B:
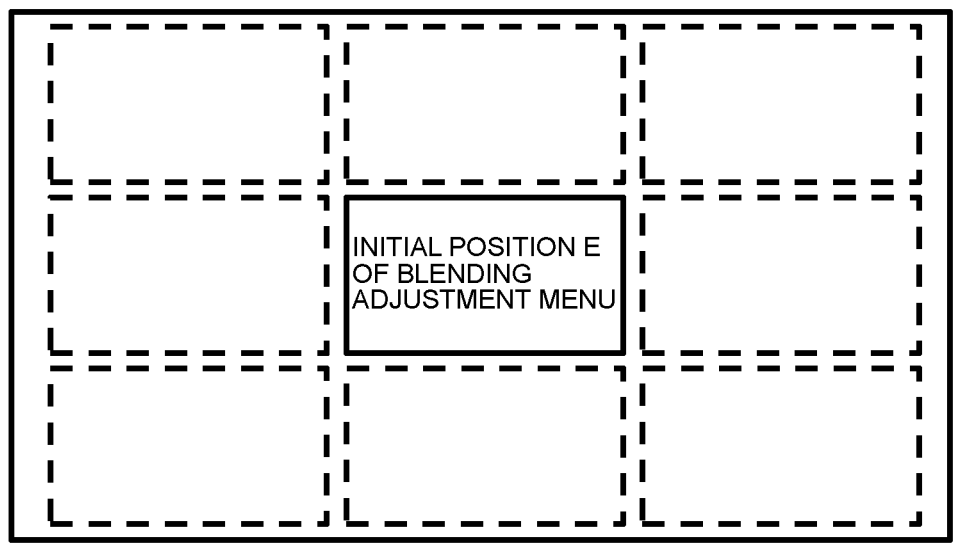
FIG. 8B is a diagram showing an initial position of a blending adjustment menu on the projection screen.

FIG. 8B shows a case where the initial position of the blending adjustment menu is, for example, the center position E of the screen, and indicates a stage before determining the direction or edge to be subjected to the blending adjustment, which is a blending adjustment mode in which the user adjusts the blending process by the image processor.

Figure 8C:
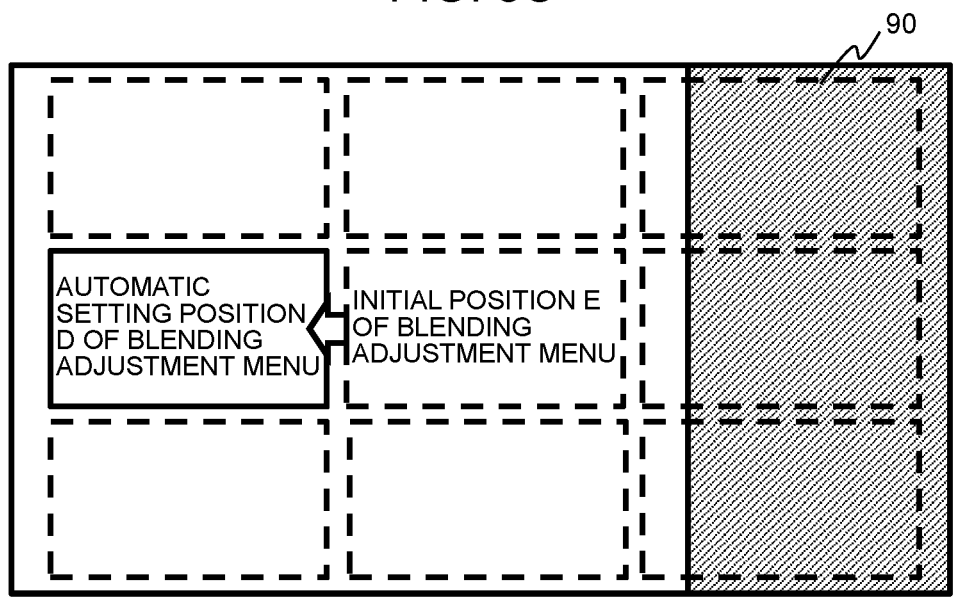
FIG. 8C is a diagram showing the position of the blending adjustment menu in a state where the blending adjustment in the first embodiment is started.

FIG. 8C is a diagram showing a state in which the blending adjustment in the present embodiment is started. As shown in FIG. 8C, when the blending adjustment is started, the position of the blending adjustment menu is automatically set at, for example, the left edge position D of the screen in a direction further away from the blending adjustment region 90 (hatched portion at the right edge in the diagram) than the initial position (for example, the center position E of the screen) of the blending adjustment menu. That is, the automatic setting position of the blending adjustment menu is configured to be said to be a position further away from one side of the projection screen than the initial position (for example, the center position E of the screen). In the example of the diagram, in the horizontal direction, the automatic setting position of the blending adjustment menu is further away from the blending adjustment region 90 than the initial position, that is, away from the blending adjustment menu range of the blending adjustment region.

Thus, according to the present embodiment, during the blending adjustment, the position of the blending adjustment menu is automatically set at a position not overlapping the blending adjustment region, so that the blending adjustment is configured to be performed while ensuring the visibility of the blending adjustment region more appropriately. In addition, the visibility of the blending adjustment menu is improved. In addition, since this is configured to be realized without the user manually changing the position of the blending adjustment menu, the operation labor of the user is configured to be reduced.

Figure 9A:
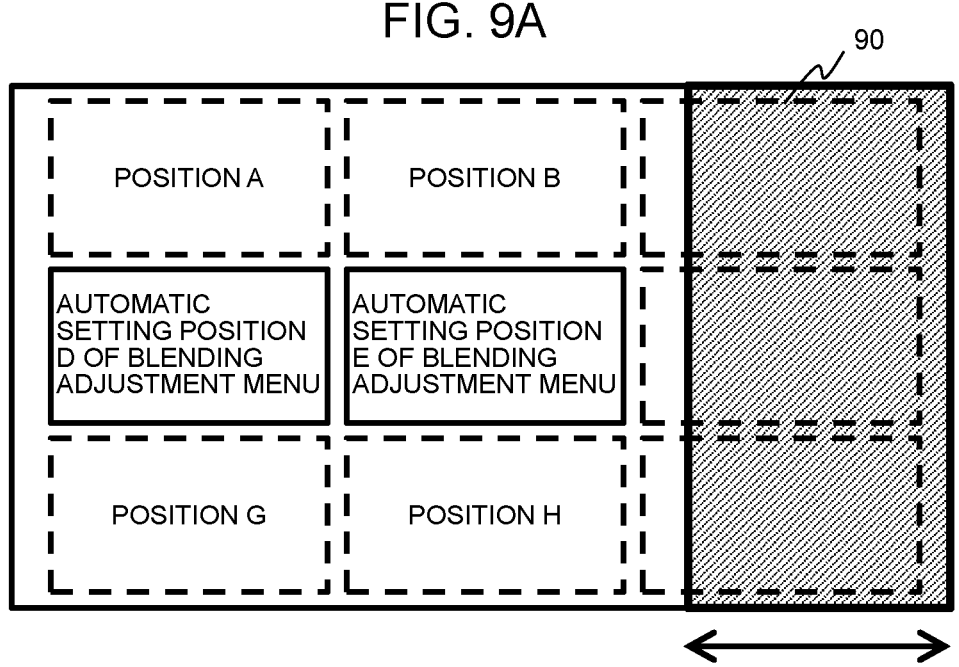
FIG. 9A is another example of the automatic setting position of the blending adjustment menu in the first embodiment.

FIG. 9A shows another example of the automatic setting position of the blending adjustment menu in the present embodiment. As shown in FIG. 9A, as long as the position does not overlap the blending adjustment region 90, the automatic setting position of the blending adjustment menu may be the automatic setting position E (center position of the screen) or the automatic setting position D (left edge position of the screen). In addition, as long as the position does not overlap the blending adjustment region 90, the automatic setting position of the blending adjustment menu is not limited to the automatic setting position D and the automatic setting position E, and may be automatically set at positions shifted up and down (positions A, B, G, H, and the like).

Figure 9B:
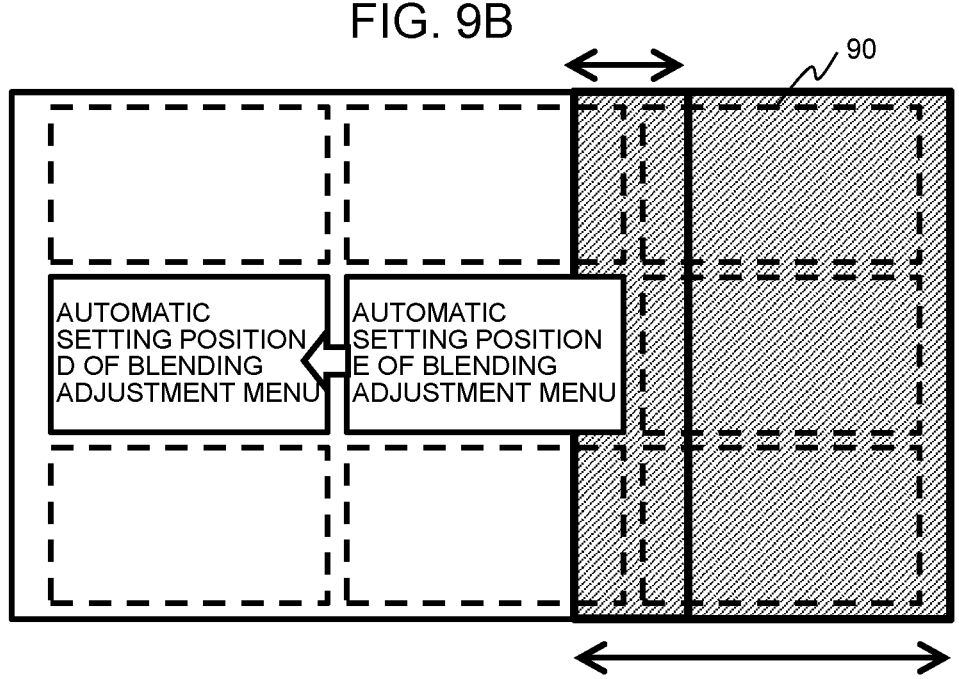
FIG. 9B is an example when the width of the blending adjustment region in FIG. 9A is changed.

However, as shown in FIG. 9B, when the width of the blending adjustment region 90 is changed, it is desirable that the automatic setting position of the blending adjustment menu is automatically set from the beginning to a position that does not overlap the blending adjustment region 90 even when the width of the blending adjustment region 90 is the maximum (in the example of FIG. 9B, the automatic setting position E is NG; the automatic setting position D is OK).

For example, with the automatic setting position E as the automatic setting position of the blending adjustment menu when the width of the blending adjustment region 90 is the minimum, the automatic setting position of the blending adjustment menu may be changed to the automatic setting position D while increasing the width of the blending adjustment region 90. In this case, however, the blending adjustment menu is moved multiple times each time the width of the blending adjustment region 90 is adjusted. This may be troublesome for the user.

Therefore, if at least the automatic setting position of the blending adjustment menu is automatically set from the beginning to a position (for example, the automatic setting position D) that does not overlap the blending adjustment region even when the width of the blending adjustment region is the maximum, the position of the blending adjustment menu is not changed frequently even if the width of the blending adjustment region is changed. For this reason, there is an advantage that this is not troublesome for the user.

Therefore, as an example of the automatic position setting of the blending adjustment menu, the automatic setting position of the blending adjustment menu may be set at a position farthest from the blending adjustment region among the menu settable positions. In this case, the visibility of the blending adjustment region is ensured to the maximum, which is preferable.

Figure 10A:
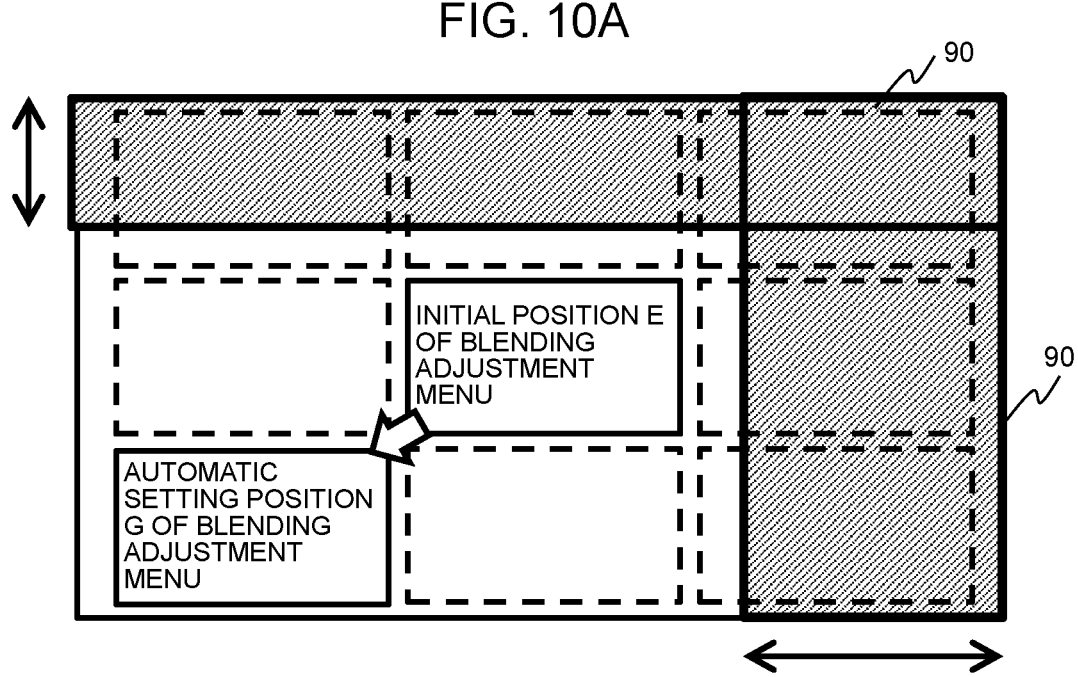
FIG. 10A is another example of the automatic setting position of the blending adjustment menu in the first embodiment.

FIG. 10A shows another example of the automatic setting position of the blending adjustment menu in the present embodiment. As shown in FIG. 10A, when the blending adjustment region 90 is a range having the same or different widths from two of the four sides of the projection screen that do not face each other, the automatic setting position of the blending adjustment menu may be set in a direction further away from each of the two sides of the projection screen than the initial position (for example, the center position E of the screen) (for example, the automatic setting position G in the diagram). In the example of the diagram, in both the vertical direction and the horizontal direction, the automatic setting position of the blending adjustment menu is further away from the blending adjustment region 90 than the initial position (for example, the center position E of the screen), that is, away from the blending adjustment menu range of the blending adjustment region 90. In this manner, during the blending adjustment, the position of the blending adjustment menu is configured to be automatically set at a position that does not overlap the blending adjustment regions corresponding to the two sides. Therefore, the blending adjustment is configured to be performed while reducing the operation labor of the user and more appropriately ensuring the visibility of each of the blending adjustment regions corresponding to the two sides. In addition, the visibility of the blending adjustment menu is improved.

Therefore, as an example of the automatic position setting of the blending adjustment menu, the automatic setting position of the blending adjustment menu may be set at a position farthest from the blending adjustment region among the menu settable positions. In this case, the visibility of the blending adjustment region is ensured to the maximum, which is preferable.

In addition, in FIG. 10A, the above two sides of the projection screen are the upper side and the right side, but the right side may be replaced with the left side or the upper side may be replaced with the lower side. The same applies when there are the blending adjustment regions 90 corresponding to the two sides in the following description.

Figure 10B:
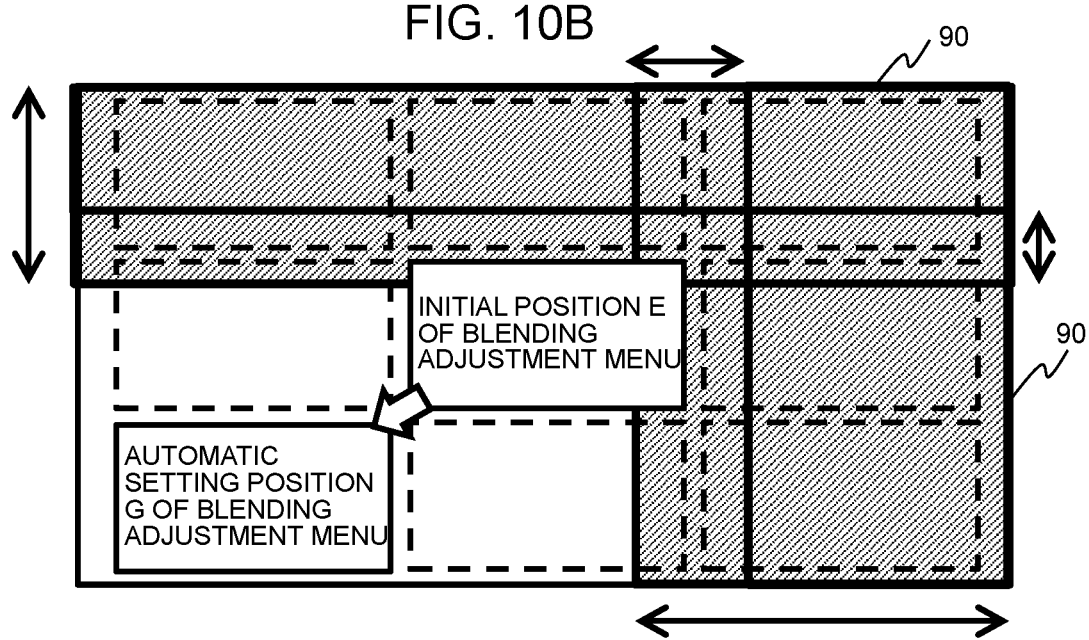
FIG. 10B is an example when the width of the blending adjustment region in FIG. 10A is changed.

In addition, as shown in FIG. 10B, when the width of each of the blending adjustment regions 90 corresponding to the two sides is configured to be adjusted through the menu, at least the automatic setting position of the blending adjustment menu may be automatically set from the beginning to a position that does not overlap the blending adjustment regions 90 even when the width of each of the blending adjustment regions 90 corresponding to the two sides is the maximum (for example, the lower left edge position G of the screen in the diagram). Since the position of the blending adjustment menu is not changed frequently even if the width of the blending adjustment region 90 is changed, there is an advantage that this is not troublesome for the user.

Therefore, as an example of the automatic position setting of the blending adjustment menu, the automatic setting position of the blending adjustment menu may be set at a position farthest from each of the blending adjustment regions 90 corresponding to the two sides among the menu settable positions (for example, the lower left edge position G of the screen in the diagram). In this case, the visibility of each of the blending adjustment regions 90 corresponding to the two sides is ensured to the maximum, which is preferable.

Figure 11A:
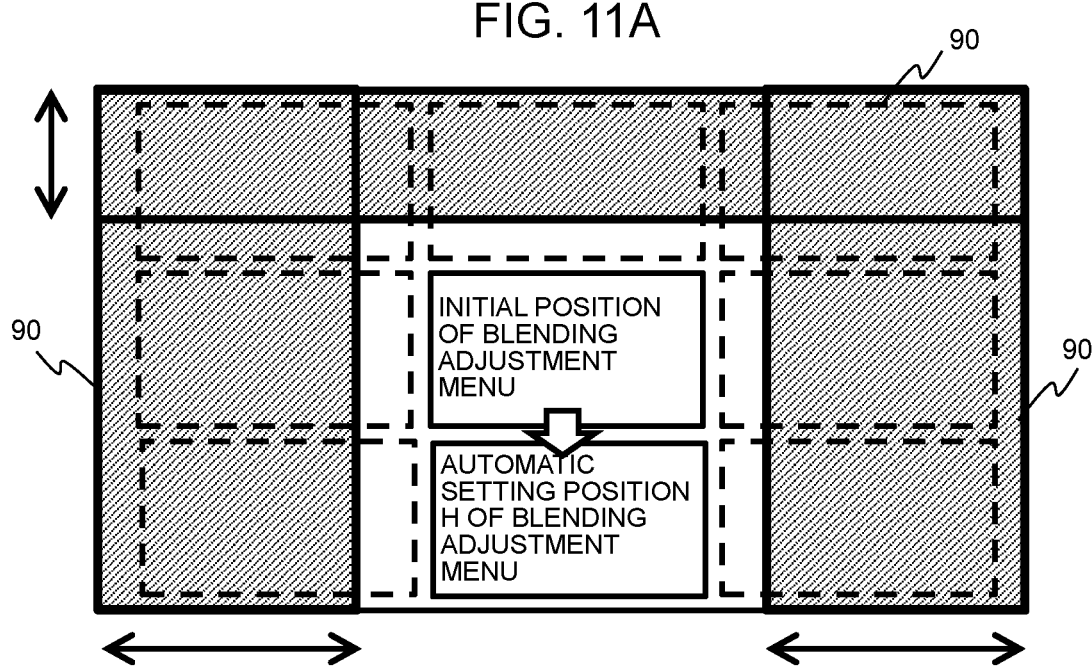
FIG. 11A is another example of the automatic setting position of the blending adjustment menu in the first embodiment.

FIG. 11A shows another example of the automatic setting position of the blending adjustment menu in the present embodiment. As shown in FIG. 11A, when the blending adjustment region 90 is a range having the same or different widths from three of the four sides of the projection screen, at least two sides (the left side and the right side of the projection screen in the example of the diagram) of these are sides where the blending adjustment regions 90 are located at opposite positions with respect to the center of the projection screen. On the last one side, the blending adjustment region 90 is not present at opposite positions with respect to the center of the projection screen. That is, only one of the four sides of the projection screen has a portion where the blending adjustment region 90 is not present.

In this case, the automatic setting position of the blending adjustment menu may be set at a position further away from the blending adjustment region 90 on the above one side where the blending adjustment region 90 is not present at opposite positions with respect to the center of the projection screen than the initial position (for example, the lower edge position H of the screen in the diagram). In the example of the diagram, in the vertical direction, the automatic setting position of the blending adjustment menu is further away from the blending adjustment menu range of the blending adjustment region 90 on the upper side than the initial position (for example, the center position E of the screen).

In addition, for the two sides where the blending adjustment regions are located at opposite positions with respect to the center of the projection screen, the automatic setting position of the blending adjustment menu may be set at an intermediate position that is not close to any of the sides.

In this manner, for the blending adjustment region of one side (upper side of the projection screen in the example of the diagram) where no blending adjustment region is present at opposite positions with respect to the center of the projection screen, the position of the blending adjustment menu is configured to be automatically set at a position away from the blending adjustment region during the blending adjustment. Therefore, the blending adjustment is configured to be performed while reducing the operation labor of the user and more appropriately ensuring the visibility of each of the blending adjustment region. In addition, the visibility of the blending adjustment menu is configured to be improved.

Figure 11B:
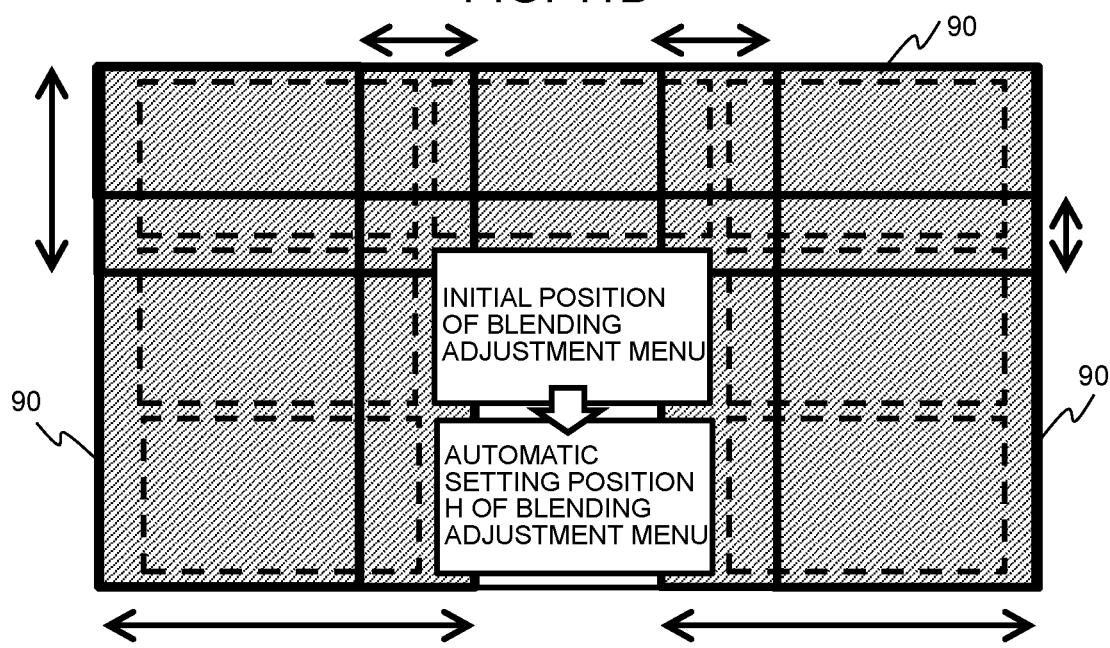
FIG. 11B is an example when the width of the blending adjustment region in FIG. 11A is changed.

Here, as shown in FIG. 11B, when the widths of the blending adjustment regions 90 corresponding to the three sides are configured to be adjusted through the blending adjustment menu, for the blending adjustment region 90 of at least one side (upper side of the projection screen in the example of the diagram) where the blending adjustment region 90 is not present at opposite positions with respect to the center of the projection screen, the automatic setting position of the blending adjustment menu may be automatically set from the beginning to a position that does not overlap the blending adjustment region 90 even when the width of the blending adjustment region 90 is the maximum (for example, the lower edge position H of the screen in the diagram). Therefore, since the position of the blending adjustment menu is not changed frequently even if the width of the blending adjustment region 90 is changed, there is an advantage that this is not troublesome for the user.

Therefore, as an example of the automatic position setting of the blending adjustment menu, the automatic setting position of the blending adjustment menu may be set at a position farthest from the blending adjustment region among the menu settable positions (for example, the lower edge position H of the screen in the diagram). In this case, the visibility of the blending adjustment region is ensured to the maximum, which is preferable.

In addition, for the blending adjustment regions of the two sides (the left side and the right side of the projection screen in the example of the diagram) where the blending adjustment regions are located at positions facing each other with the center of the projection screen as a reference, it was already described that, during the blending adjustment, the position of the blending adjustment menu was placed at least in the middle of the two sides. At this time, when the widths of the blending adjustment regions of the two sides (the left side and the right side of the projection screen in the diagram) are maximized, the overlapping between the blending adjustment menu and one or both of the blending adjustment regions may be allowed. This is because the two blending adjustment regions are located at opposite positions with respect to the center of the projection screen at that time, and accordingly, the blending adjustment menu is not configured to be avoided in any of both the blending adjustment regions when the widths of both the blending adjustment regions are maximized. In this case, it is desirable to maintain the position of the blending adjustment menu at an intermediate position in a direction in which both the blending adjustment regions face each other (horizontal direction in the example of the diagram). This is because, even when the blending adjustment menu and both the blending adjustment regions overlap each other, the blending adjustment is configured to be performed while maintaining the balance of visibility of both the blending adjustment regions.

Figure 12A:
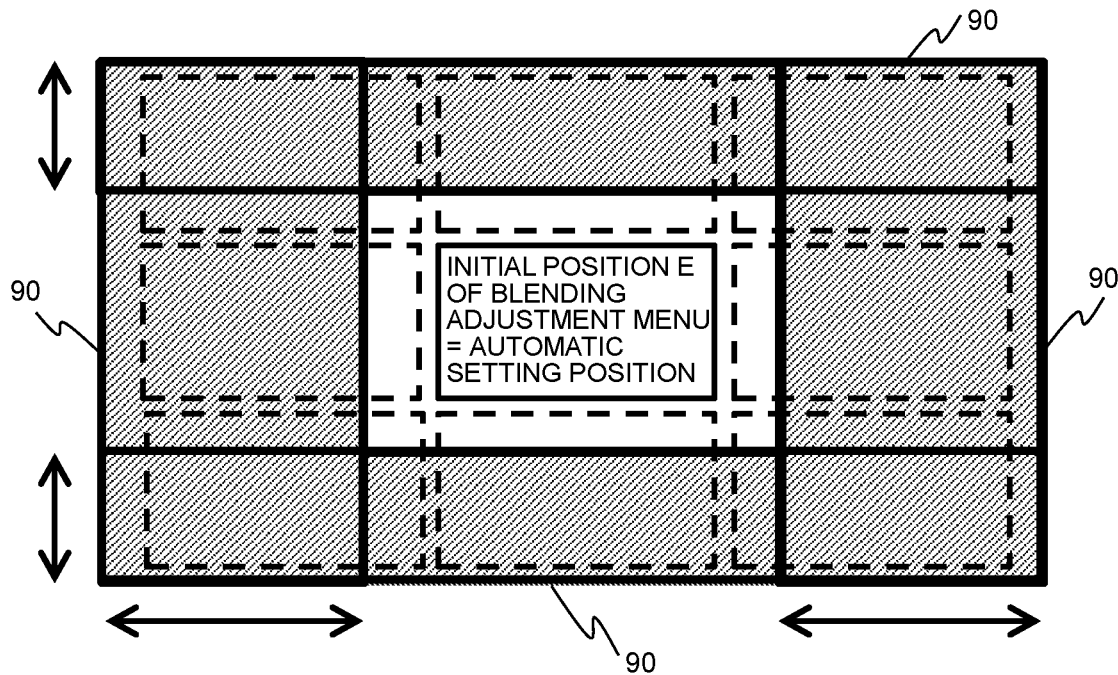
FIG. 12A is another example of the automatic setting position of the blending adjustment menu in the first embodiment.

FIG. 12A shows another example of the automatic setting position of the blending adjustment menu in the present embodiment. As shown in FIG. 12A, when the blending adjustment region 90 is a range having the same or different widths from all of the four sides of the projection screen, the automatic setting position of the blending adjustment menu may be set at approximately the center position (position E) of the projection screen similarly to the initial position (this may be expressed that position change according to the automatic setting position is not performed). This is because, in this case, the possibility that the center position of the projection screen will not overlap the blending adjustment menu and the blending adjustment regions 90 corresponding to all the four sides is the highest. In this manner, the blending adjustment is configured to be performed while maintaining the balance of visibility of the blending adjustment regions 90 corresponding to all the four sides.

Figure 12B:
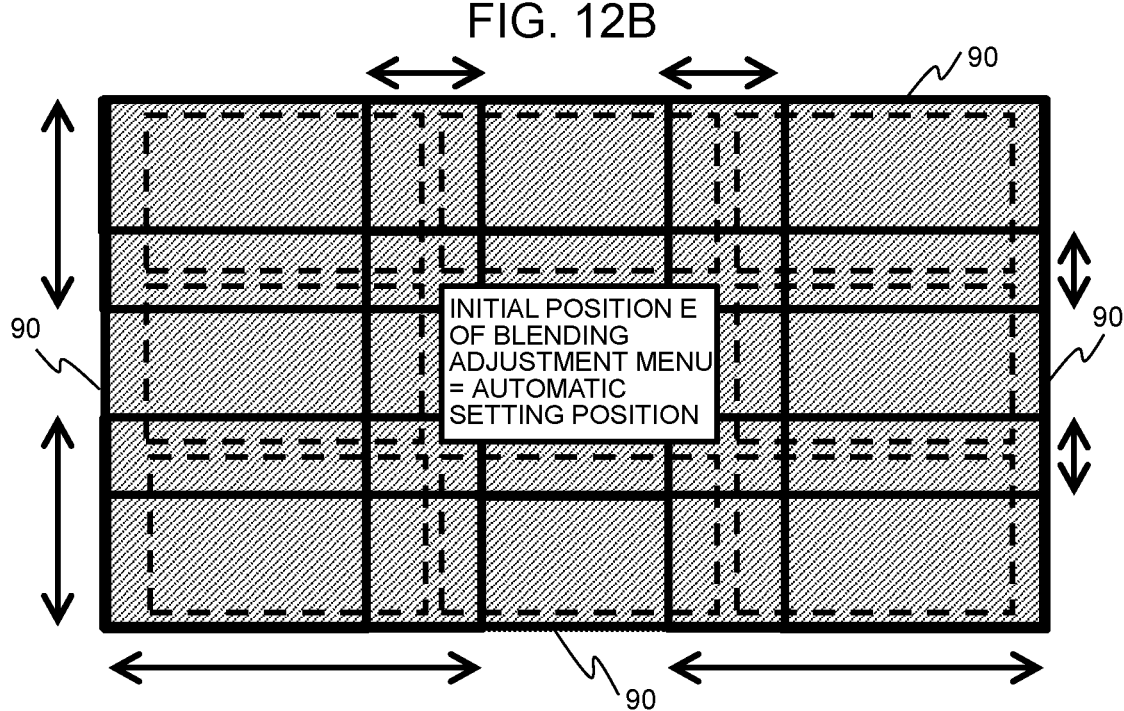
FIG. 12B is an example when the width of the blending adjustment region in FIG. 12A is changed.

Here, as shown in FIG. 12B, when the width of each of the blending adjustment regions 90 corresponding to all the four sides are configured to be adjusted through the blending adjustment menu, it has been described that the center position (position E) of the projection screen is set as the automatic setting position of the blending adjustment menu. At this time, when the widths of the blending adjustment regions are maximized, the overlapping between the blending adjustment menu and the blending adjustment regions 90 may be allowed. Even when the blending adjustment menu and the blending adjustment regions 90 overlap each other, the blending adjustment is configured to be performed while maintaining the balance of visibility of the blending adjustment regions 90 as long as the overlapping position is the center position of the projection screen.

Figure 13A:
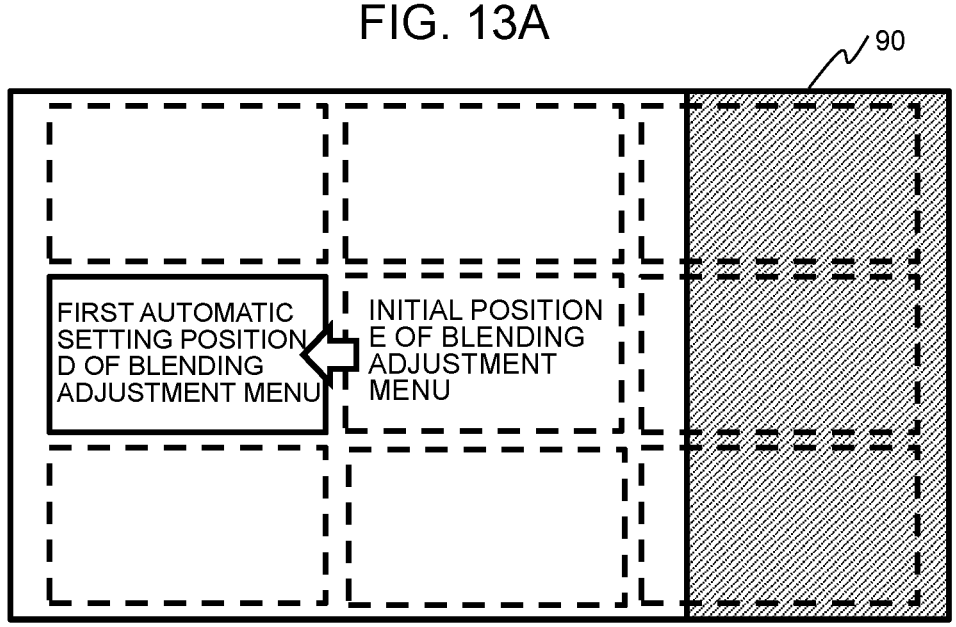
FIG. 13A is another example of the automatic setting position of the blending adjustment menu in the first embodiment.

FIG. 13A shows still another example of the automatic setting position of the blending adjustment menu in the present embodiment. As shown in FIG. 13A, each time the position of the blending adjustment region 90 is changed or added through the blending adjustment menu, the automatic setting of the position of the blending adjustment menu may be repeated without returning to the initial position (for example, the center position E of the screen).

In FIG. 13A, as in FIG. 8C, for example, the blending adjustment menu position (for example, the left edge position D of the screen) is automatically set in a direction away from the blending adjustment region 90 having a predetermined width from one side of the projection screen (for example, the right side of the projection screen). This is the first automatic setting position.

Figure 13B:
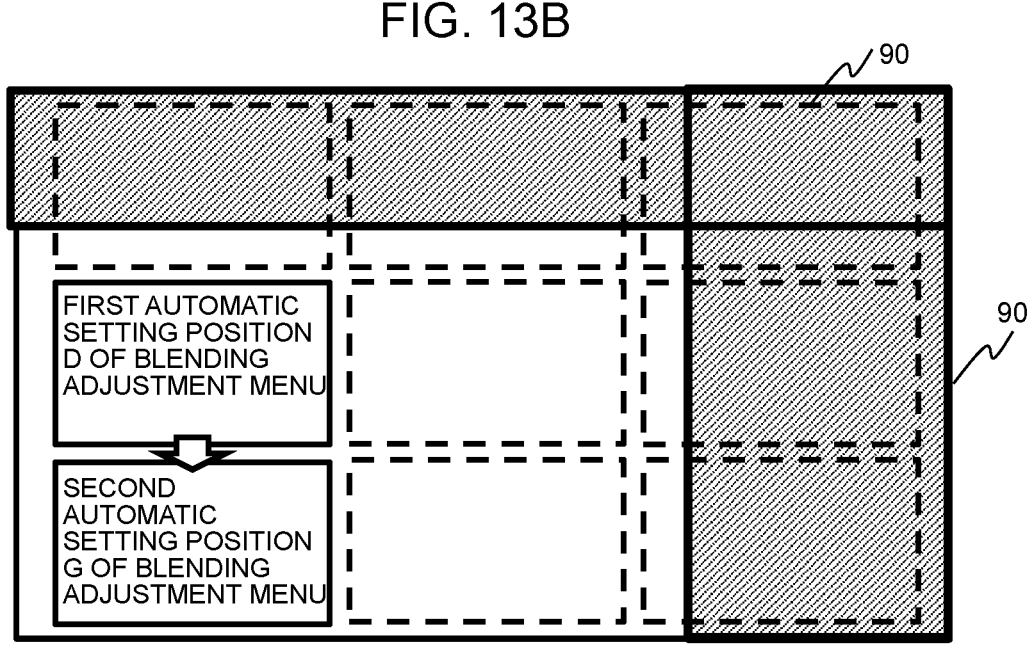
FIG. 13B is an example when a blending adjustment region is added to another side in FIG. 13A.

Then, as shown in FIG. 13B, when the blending adjustment region 90 having a predetermined width from another side of the projection screen (for example, the upper side of the projection screen) is added as a blending adjustment target, the blending adjustment menu position may be automatically changed from the first automatic setting position to the lower left position G of the screen as in FIG. 10A without returning to the initial position (for example, the center position E of the screen). This is the second automatic setting position.

Figure 13C:
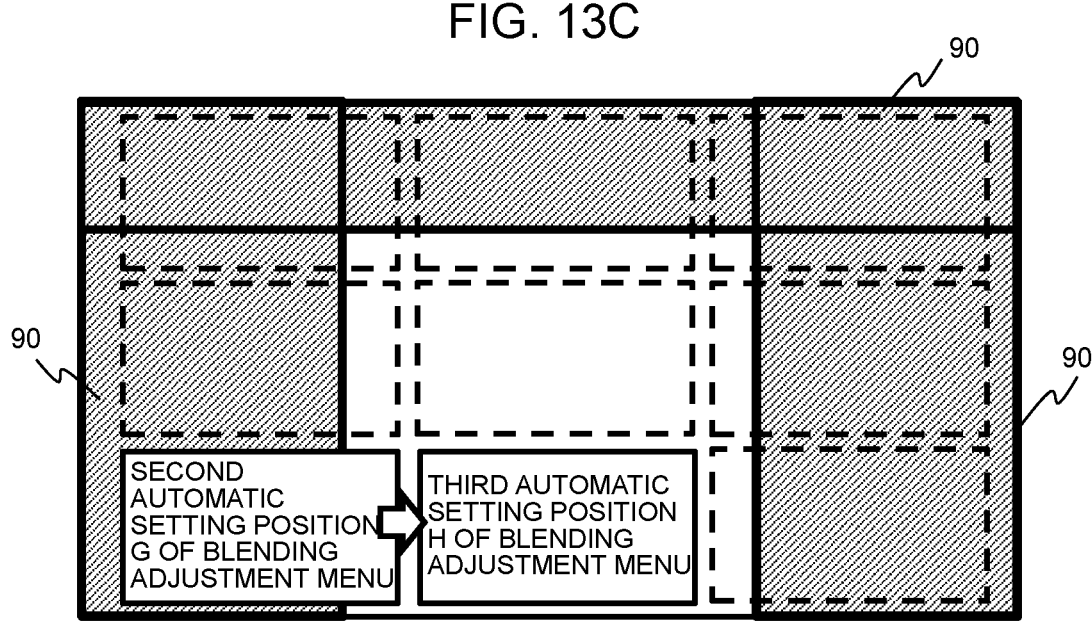
FIG. 13C is an example when a blending adjustment region is added to another side in FIG. 13B.

Then, as shown in FIG. 13C, even when the blending adjustment region 90 having a predetermined width from another side of the projection screen (for example, the left side of the projection screen) is further added as a blending adjustment target, the blending adjustment menu position may be automatically changed from the second automatic setting position to the lower position H of the screen as in FIG. 11A without returning to the initial position (for example, the center position E of the screen). This is the third automatic setting position.

Figure 13D:
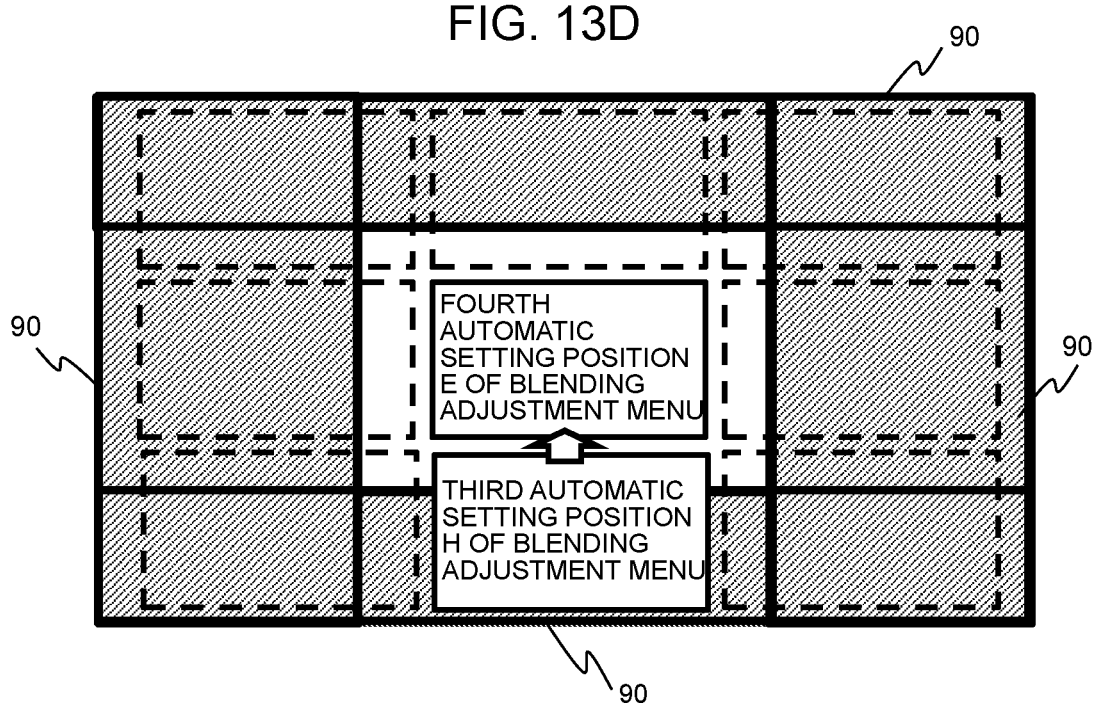
FIG. 13D is an example when a blending adjustment region is added to another side in FIG. 13C.

Then, as shown in FIG. 13D, even when the blending adjustment region 90 having a predetermined width from another side of the projection screen (for example, the lower side of the projection screen) is further added as a blending adjustment target, the blending adjustment menu position may be automatically changed from the third automatic setting position to the center position E of the screen as in FIG. 12A. This is the fourth automatic setting position.

Thus, by configuring the blending adjustment region 90 as shown in FIGS. 13A to 13D, it is possible to continuously change the automatic setting position of the blending adjustment menu corresponding to the change of the position of the blending adjustment region 90 and the change of the number of sides corresponding to the blending adjustment region 90. This is advantageous in that the user is configured to smoothly perform the blending adjustment work.

As described above, according to the present embodiment, the position of the blending adjustment menu during the blending adjustment is automatically set according to the position and shape of the blending adjustment region 90 or the position and number of sides corresponding to the blending adjustment region 90. Therefore, the blending adjustment is configured to be performed while more appropriately ensuring the visibility of the blending adjustment region. In addition, the visibility of the blending adjustment menu is improved. In addition, since this is configured to be realized without the user manually changing the position of the blending adjustment menu, the operation labor of the user is configured to be reduced. That is, according to the projection type video display apparatus according to the present embodiment, more appropriate blending adjustment is configured to be realized.

Second Embodiment

The present embodiment is an example regarding the relationship between a blending adjustment menu and a normal menu.

Figure 14:
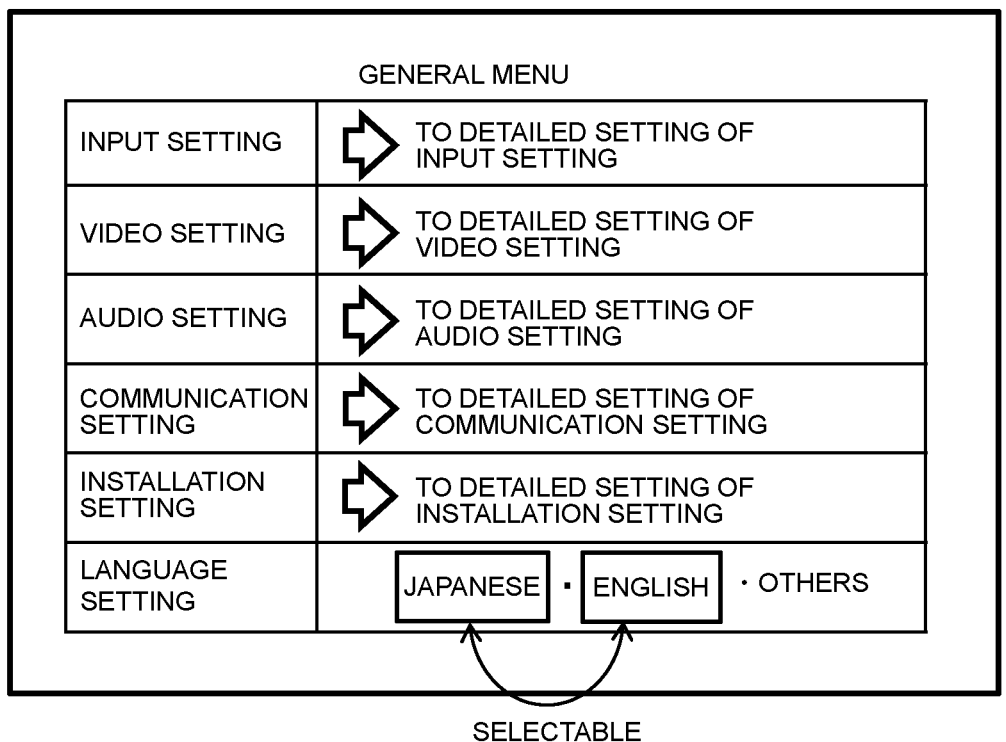
FIG. 14 is a diagram showing an example of a normal menu in a second embodiment.

FIG. 14 is a diagram showing an example of the normal menu in the present embodiment. The normal menu is a non-blending-only menu, and may be expressed as a general menu. As shown in FIG. 14, the normal menu includes, for example, input setting, video setting, audio setting, communication setting (network setting), installation setting, language setting, and the like. By selecting each item, it is possible to move to the detailed menu of each item and make more detailed setting (detailed setting). In addition, items including the movement to the blending adjustment menu are also included. The movement to the blending adjustment menu may be configured such that, for example, after selecting the installation setting and moving to the detailed setting of the installation setting, selection as a menu movement destination is possible.

Figure 15A:
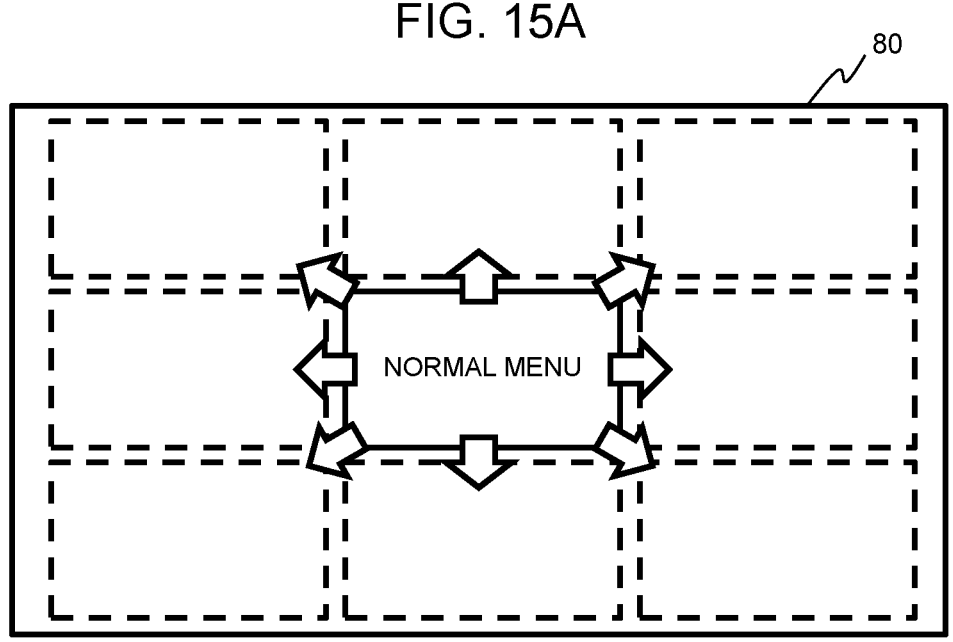
FIG. 15A is a diagram showing a concept of user manual position setting of the display position of a normal menu in the second embodiment.

FIG. 15A is a diagram showing the concept of user manual position setting of the display position of the normal menu in the present embodiment. As shown in FIG. 15A, there is provided a function of changing the display position from the initial position (center position E of the screen in the example of the diagram) of the normal menu to a desired position by the user. As a result, the usability of the user is improved.

Figure 15B:
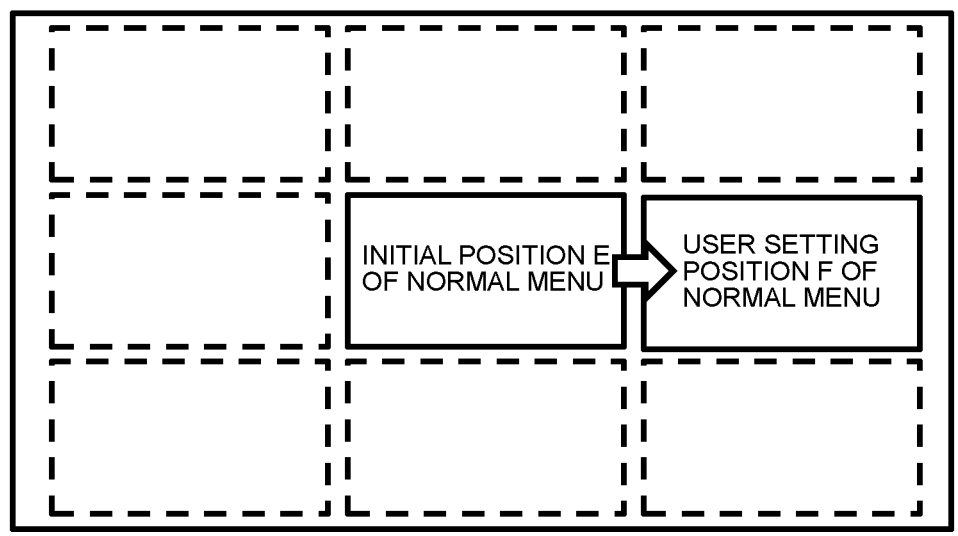
FIG. 15B is a diagram showing an example in which the display position of the normal menu is changed from the initial position by the user manual position setting of the normal menu in the second embodiment.

FIG. 15B shows an example in which the display position of the normal menu is changed from the initial position by the user manual position setting in the normal menu. FIG. 15B shows an example in which the user determines the user setting position at the position F of the right edge of the screen while the initial position is the center position E of the screen.

Figure 15C:
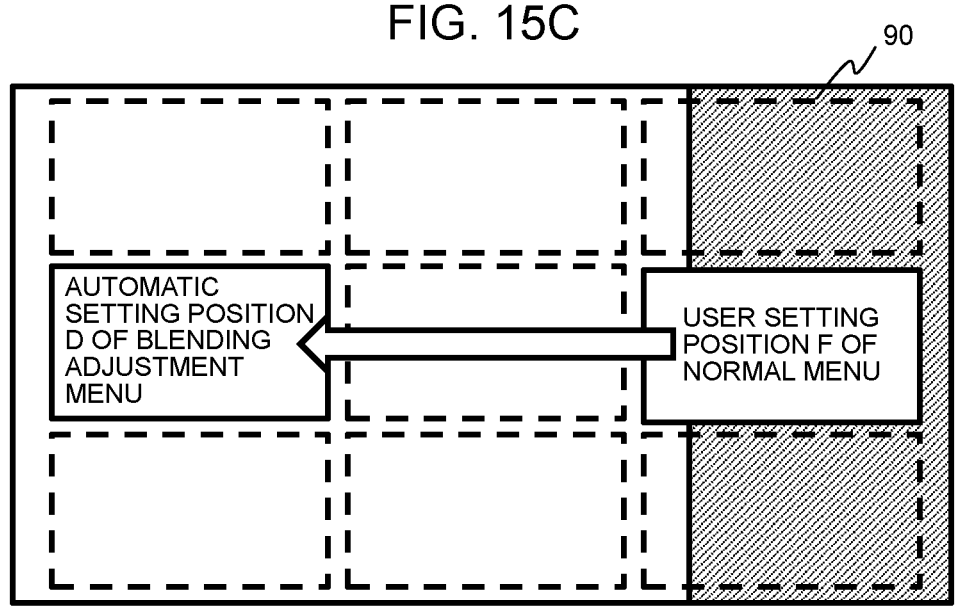
FIG. 15C is a diagram showing a display when proceeding to blending adjustment from the normal menu in the second embodiment.

FIG. 15C shows a display when proceeding to the blending adjustment from the normal menu. As shown in FIG. 15C, when proceeding to the blending adjustment from the position (in the example of the diagram, the right edge F of the screen that is the user setting position) set by the user manual position setting in the normal menu, the automatic position setting of the blending adjustment menu for changing the menu position to a position (left edge D of the screen in the example of the diagram) that does not overlap the blending adjustment region 90 is performed regardless of the position of the user manual position setting in the normal menu. Since the conditions of the position of the automatic position setting of the blending adjustment menu have been described in the first embodiment, the description thereof will be omitted. During the blending adjustment, the position of the blending adjustment menu is automatically set at a position not overlapping the blending adjustment region 90, so that the blending adjustment is configured to be performed while ensuring the visibility of the blending adjustment region 90 more appropriately.

Figure 15D:
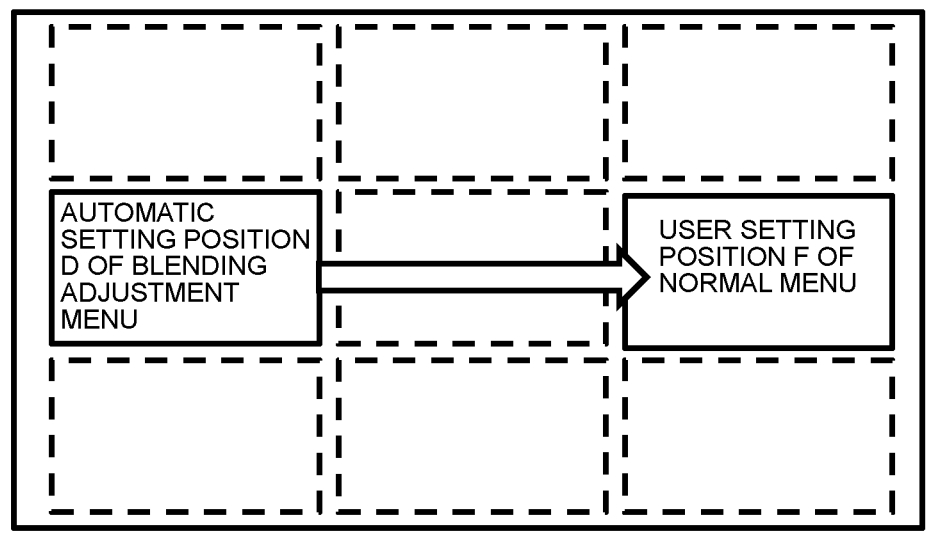
FIG. 15D is a diagram showing a display when the blending adjustment in the second embodiment is completed.

FIG. 15D shows a display when the blending adjustment is completed. As shown in FIG. 15D, when the blending adjustment is completed, the position automatically returns to the position set by the user manual position setting in the normal menu (in the example in the diagram, the right edge F of the screen that is the user setting position). The user manual position setting of the normal menu may be stored in a non-volatile memory.

Thus, during the blending adjustment, the position of the blending adjustment menu is automatically set at a position not overlapping the blending adjustment region 90, and the blending adjustment is performed while reducing the operation labor of the user and more appropriately ensuring the visibility of the blending adjustment region 90. After the blending adjustment is completed, the normal menu is configured to be returned to a desired position that the user considers preferable during normal use and used. Since this series of flow is configured to be realized without the user having to manually change the menu position each time, there is an advantage that the operation labor of the user is configured to be reduced.

As described above, according to the present embodiment, in addition to the effect of the first embodiment, there are the following effects. That is, even when the position of the normal menu is set at a desired position that the user considers preferable during normal use, during the blending adjustment, the position of the blending adjustment menu is automatically set at a position not overlapping the blending adjustment region even if the position is different from the setting position of the normal menu. As a result, the blending adjustment is configured to be performed while reducing the operation labor of the user and more appropriately ensuring the visibility of the blending adjustment region and the blending adjustment menu. In addition, after the blending adjustment is completed, the menu position is configured to be automatically returned to the setting position (that is, a desired position that the user considers preferable during normal use) of the normal menu and used. Since this series of flow is configured to be realized without the user having to manually change the menu position each time, there is an advantage that the operation labor of the user is configured to be reduced. That is, according to the projection type video display apparatus according to the present embodiment, more appropriate blending adjustment is configured to be realized.

Third Embodiment

The present embodiment is an example in which the user is configured to manually change the blending adjustment menu position after the blending adjustment menu position is automatically set.

Figure 16A:
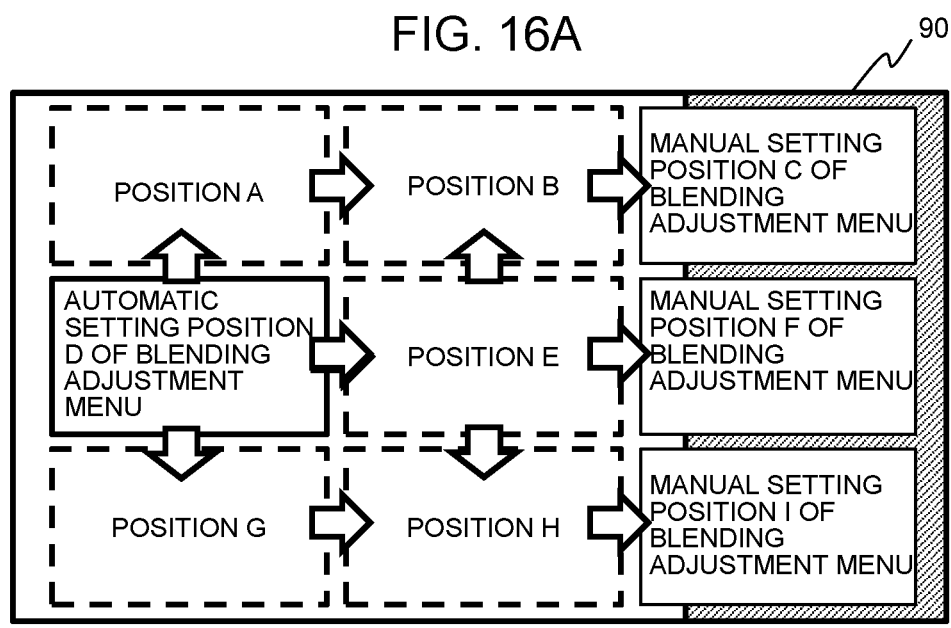
FIG. 16A is a diagram showing an automatic setting position and a manual setting position of the blending adjustment menu in a third embodiment.

FIG. 16A is a diagram showing an automatic setting position and a manual setting position of the blending adjustment menu in the present embodiment. As shown in FIG. 16A, after the position of the blending adjustment menu is automatically set (for example, the left edge position D of the screen in the example of the diagram), the user may be able to manually change the blending adjustment menu position (for example, the right edge positions C, F, and I of the screen in the example of the diagram). In addition, the manual operation of the user is configured to be changed through the blending adjustment menu or the user operation using a remote control.

As already described, the purpose of the above-described automatic setting of the blending adjustment menu position is to more appropriately ensure the visibility of the blending adjustment region. However, depending on the use environment of the user, the position of the automatic setting of the blending adjustment menu position may be a position where the menu itself is difficult to visually recognize at the time of setting. In this case, it is desirable that the user is configured to manually change the blending adjustment menu position after the blending adjustment menu position is automatically set.

In addition, in this case, when the user manually changes the blending adjustment menu position, the issue is whether or not the blending adjustment menu is configured to be manually set not only at a position not overlapping the blending adjustment region being adjusted (for example, the positions A, B, E, G, and H in the example of the diagram) but also at a position overlapping the blending adjustment region being adjusted (for example, the positions C, F, and I in the example of the diagram).

Here, in the present embodiment, the blending adjustment menu is configured to be manually set even at the position overlapping the blending adjustment region being adjusted (for example, the positions C, F, and I in the example of the diagram). This is because, depending on the use environment of the user, even if the visibility of the blending adjustment region during blending adjustment is partially deteriorated, the user may think that the blending adjustment menu position should be manually changed up to a position where the blending adjustment menu overlaps the blending adjustment region being adjusted.

Figure 16B:
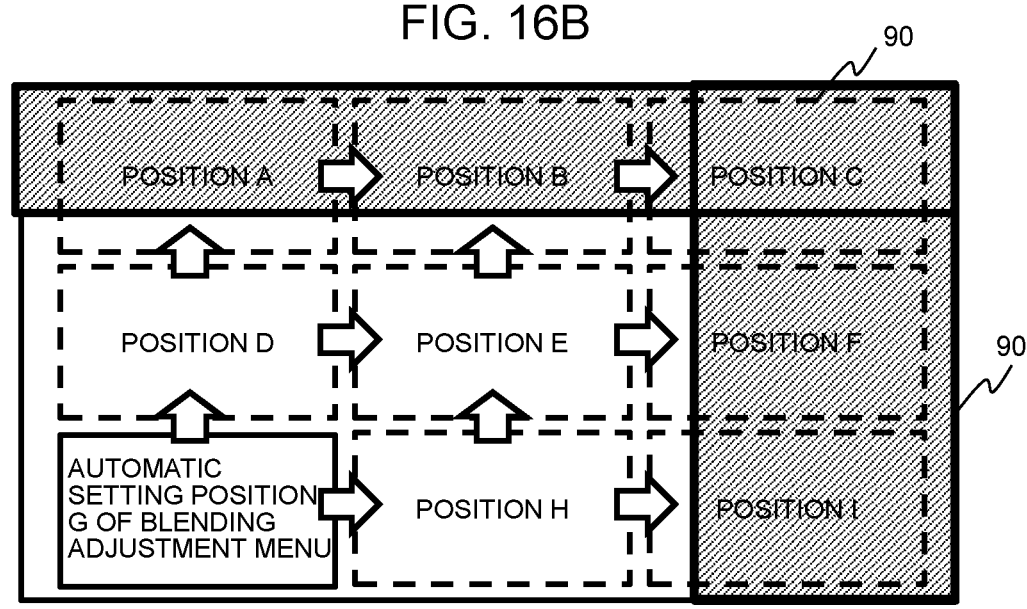
FIG. 16B is a diagram showing an automatic setting position and a manual setting position of the blending adjustment menu when blending adjustment regions are present on two sides in the third embodiment.

FIG. 16B is a diagram showing an automatic setting position and a manual setting position of the blending adjustment menu in the present embodiment when the blending adjustment region corresponds to two sides of the projection screen. As shown in FIG. 16B, the concept of manually changing the blending adjustment menu position by the user after the automatic setting of the blending adjustment menu position is the same even when the blending adjustment region 90 corresponds to two sides of the projection screen. That is, after the blending adjustment menu position is automatically set (for example, the lower left position G of the screen in the example of the diagram), when the user manually changes the blending adjustment menu position, the blending adjustment menu is configured to be manually set not only at a position not overlapping the blending adjustment region 90 being adjusted (for example, the positions D, E, and H in the example of the diagram) but also at a position overlapping the blending adjustment region 90 being adjusted (for example, the positions A, B, C, F, and I in the example of the diagram).

Figure 16C:
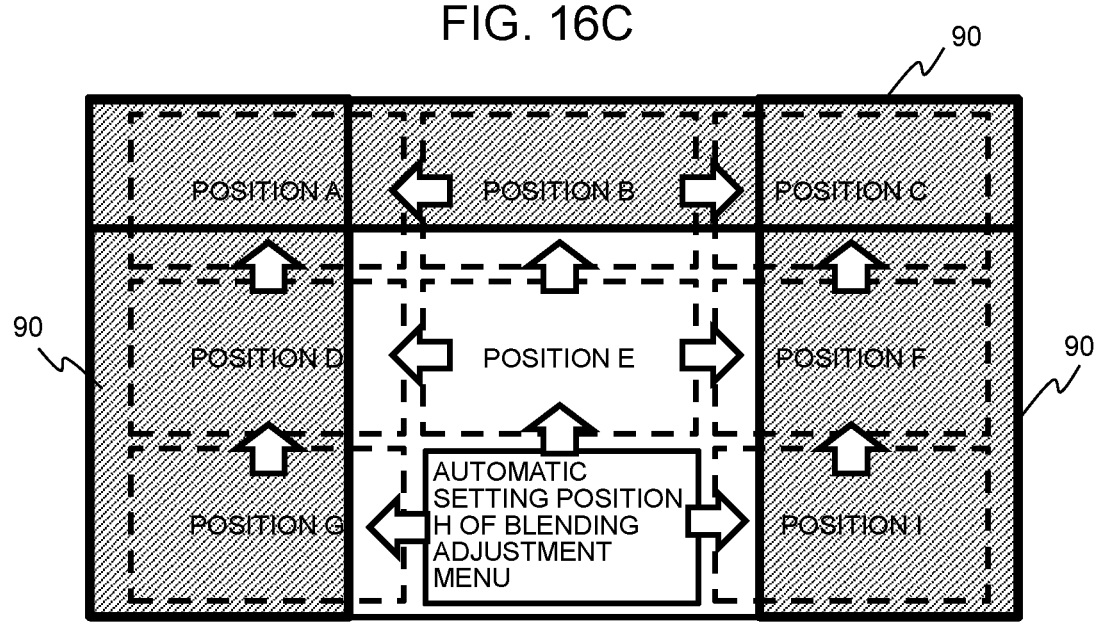
FIG. 16C is a diagram showing an automatic setting position and a manual setting position of the blending adjustment menu when blending adjustment regions are present on three sides in the third embodiment.

FIG. 16C is a diagram showing an automatic setting position and a manual setting position of the blending adjustment menu in the present embodiment when the blending adjustment region is a range having the same or different widths from three of the four sides of the projection screen. As shown in FIG. 16C, the concept of manually changing the blending adjustment menu position by the user after the blending adjustment menu position is automatically set is the same even when the blending adjustment region is a range having the same or different widths from three of the four sides of the projection screen. That is, after the blending adjustment menu position is automatically set (for example, the lower edge position H of the screen in the example of the diagram), when the user manually changes the blending adjustment menu position, the blending adjustment menu is configured to be manually set not only at a position not overlapping the blending adjustment region being adjusted (for example, the position E in the example of the diagram) but also at a position overlapping the blending adjustment region being adjusted (for example, the positions A, B, C, D, F, G, and I in the example of the diagram).

Figure 16D:
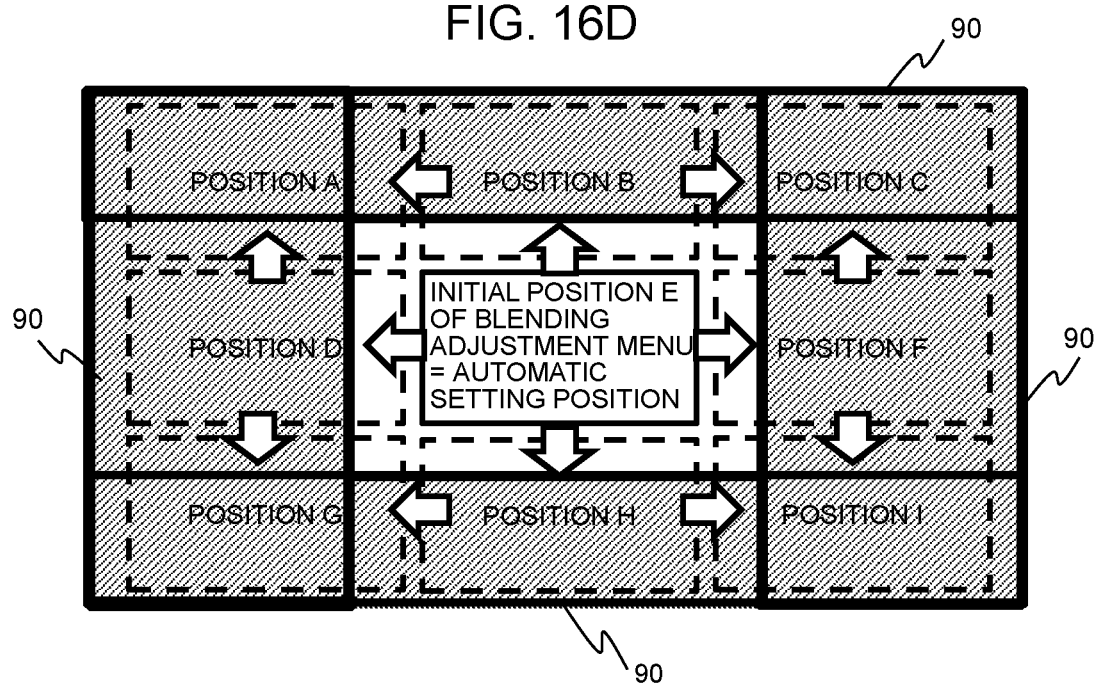
FIG. 16D is a diagram showing an automatic setting position and a manual setting position of the blending adjustment menu when blending adjustment regions are present on four sides in the third embodiment.

In addition, FIG. 16D is a diagram showing an automatic setting position and a manual setting position of the blending adjustment menu in the present embodiment when the blending adjustment region is a range having the same or different widths from all of the four sides of the projection screen. As shown in FIG. 16D, the concept of manually changing the blending adjustment menu position by the user after the blending adjustment menu position is automatically set is the same even when the blending adjustment region 90 is a range having the same or different widths from all of the four sides of the projection screen. That is, after the blending adjustment menu position is automatically set (for example, the center position E of the screen in the example of the diagram), when the user manually changes the blending adjustment menu position, the blending adjustment menu is configured to be manually set at a position overlapping the blending adjustment region 90 being adjusted (for example, the positions A, B, C, D, F, G, H, and I in the example of the diagram).

By preparing not only the automatic setting of the blending adjustment menu position but also the manual setting of the blending adjustment menu position with a high degree of freedom in this manner, it is possible to obtain the advantages of both the automatic setting of the blending adjustment menu position for more appropriately ensuring the visibility of the blending adjustment region while reducing the operation labor of the user and the manual setting of the blending adjustment menu position corresponding to various conditions under the use environment of the user.

As described above, according to the present embodiment, in addition to the effect of the first embodiment, there are the following effects. That is, it is possible to obtain the advantage of manually setting the blending adjustment menu position corresponding to various conditions under the use environment of the user. That is, according to the projection type video display apparatus according to the present embodiment, more appropriate blending adjustment is configured to be realized.

Fourth Embodiment

In the present embodiment, an example configured to change the size of the blending adjustment menu will be described.

Figure 17A:
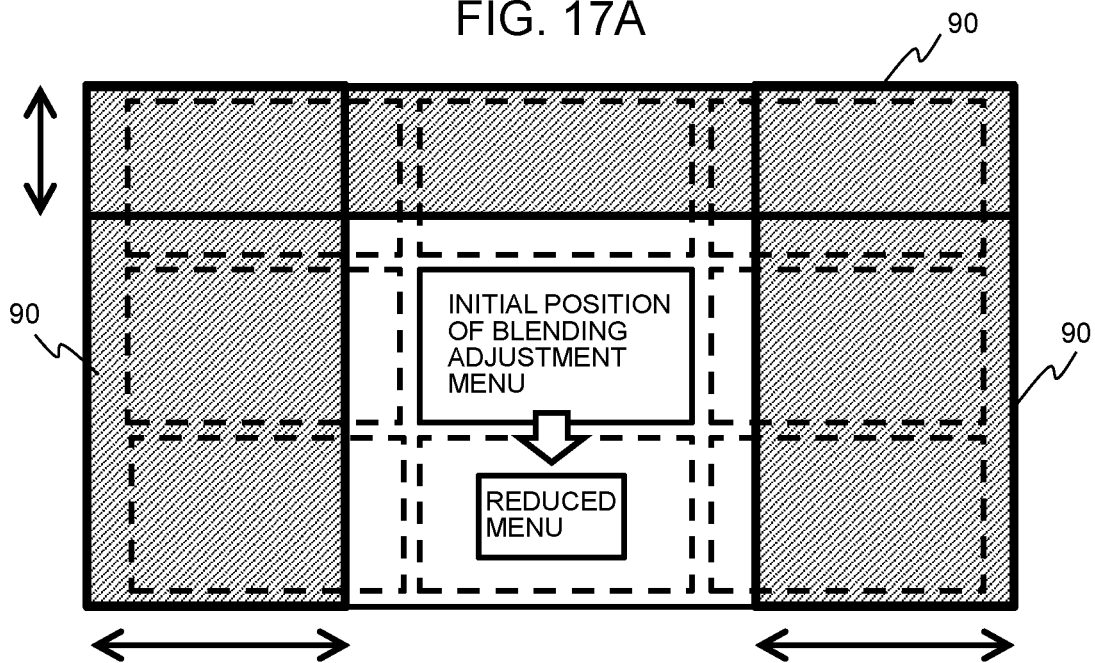
FIG. 17A is a diagram describing the automatic display setting of a blending adjustment menu in a fourth embodiment.

FIG. 17A is a diagram describing the automatic display setting of the blending adjustment menu in the present embodiment. As shown in FIG. 17A, when the blending adjustment regions 90 are present on two opposite sides of the projection screen (the left side and the right side of the projection screen in the example of the diagram), the automatic setting of the blending adjustment menu position may contribute to improving the visibility of the blending adjustment region 90 on one of the sides even if the position is changed in the horizontal direction but may not contribute to improving the visibility of the other blending adjustment region 90. Therefore, in the present embodiment, in such a case, the size of the blending adjustment menu is automatically reduced. As a result, it is possible to improve the visibility during the blending adjustment for both of the blending adjustment regions on the two opposite sides of the projection screen (the left side and the right side of the projection screen in the example of the diagram).

As a method of reducing the size of the blending adjustment menu, the display content including characters may be simply scaled so as to be reduced. Alternatively, in order to ensure the visibility of characters, the size of the display range of the blending adjustment menu may be reduced by reducing the display content in the blending adjustment menu, for example, by reducing the display items without changing the character size.

In addition, the menu may be configured such that the blending adjustment menu having the original size is configured to be manually returned after the automatic switching of the blending adjustment menu to the reduced menu.

In addition, the menu may be configured so as to be able to be manually changed to the reduced menu before the automatic switching of the blending adjustment menu to the reduced menu is performed.

FIG. 17B is a diagram describing the automatic display setting of the blending adjustment menu when the width of the blending adjustment region 90 is changed in the present embodiment. As shown in FIG. 17B, if the size of the blending adjustment menu is automatically reduced, the possibility that the visibility of the blending adjustment region 90 during the blending adjustment is configured to be maintained even if the width of the blending adjustment region 90 is changed increases.

FIG. 18 is an example of a reduced menu of the blending adjustment menu in the present embodiment. In FIG. 18, as compared with the blending adjustment menu in FIG. 5, the number of characters is reduced by changing the display of each item to abbreviated notation without changing the size of the characters, thereby reducing the range of the blending adjustment menu. In addition, the range of the blending adjustment menu is reduced by omitting the slide bar in some items to display only the index value for adjustment.

In addition, a manual switching button (denoted as "enlarge" in the example of the diagram) for switching from the reduced menu of the blending adjustment menu to the large menu of the blending adjustment menu may be provided. In addition, a manual switching button (denoted as "general" in the example of the diagram) for switching to the general menu may be provided. In addition, a button (indicated as "M position manual" in the example of the diagram) for switching of the blending adjustment menu to the manual position change mode may be provided.

As described above, according to the present embodiment, in addition to the effect of the first embodiment, there are the following effects. That is, automatically reducing the size of the blending adjustment menu is configured to contribute to improving or maintaining the visibility of the blending adjustment region during the blending adjustment. That is, according to the projection type video display apparatus according to the present embodiment, more appropriate blending adjustment is configured to be realized.

While the embodiments have been described above, the present invention is not limited to the embodiments described above, and includes various modification examples. In addition, the above embodiments have been described in detail for easy understanding of the present invention, but the present invention is not necessarily limited to having all the components described above. In addition, it is possible to replace some of the components in the embodiments with other components. In addition, it is possible to add the component of another embodiment to the component of one embodiment. In addition, for some of the components in each embodiment, addition, removal, and replacement of other components are possible.

REFERENCE SIGNS LIST 50, 60, 70 Entire video
51 Partial video 1
52 Partial video 2
80 Projection screen
90 Blending adjustment region
100 Projection type video display apparatus
101 Projection optical system
102 Display element
105 Light source
107 Operation input interface
110 Controller
160 Image processor

The invention claimed is:

1. A projection video display apparatus, comprising:
a projection optical system configured to project a projection video based on a video displayed by a display element;
an image processor; and
a controller, wherein
in order to combine the projection video with a projection video of another projection video display apparatus, the controller is configured to control the image processor to perform a blending process for partially changing brightnesses of the projection videos,
the controller is configured to perform control to set a mode of the projection video display apparatus to a blending adjustment mode in which a user adjusts the blending process performed by the image processor,
in the blending adjustment mode, the controller is configured to perform control to generate a menu image of the blending adjustment menu and display the menu image in the projection video,
in the blending adjustment mode, the controller automatically changes a display position of the blending adjustment menu according to a position of a blending adjustment region that is a region to be adjusted by the blending process,
the blending adjustment region is configured to be set along each of four sides of a rectangle of the projection video projected by the projection optical system,
in the blending adjustment mode, the display position of the blending adjustment menu is automatically changed in a direction further away from a side corresponding to the blending adjustment region than a center of the projection video,
in the blending adjustment mode, a width of the blending adjustment region is configured to be set by the user, and
when automatically changing the display position of the blending adjustment menu, even if the user changes the width of the blending adjustment region to the maximum, the display position of the blending adjustment menu is automatically changed to a position where the blending adjustment menu does not overlap the blending adjustment region with only one automatic position change.

2. A projection typo video display apparatus, comprising:
a projection optical system configured to project a projection video based on a video displayed by a display element;
an image processor; and
a controller, wherein
in order to combine the projection video with a projection video of another projection video display apparatus, the controller is configured to control the image processor to perform a blending process for partially changing brightnesses of the projection videos,
the controller is configured to perform control to set a mode of the projection typo video display apparatus to a blending adjustment mode in which a user adjusts the blending process performed by the image processor,
in the blending adjustment mode, the controller is configured to perform control to generate a menu image of the blending adjustment menu and display the menu image in the projection video,
in the blending adjustment mode, the controller automatically changes a display position of the blending adjustment menu according to a position of a blending adjustment region that is a region to be adjusted by the blending process,
in the blending adjustment mode, the position of the blending adjustment region or the position of the blending adjustment region and the number of blending adjustment regions are configured to be changed by selection of the user, and
the display position of the blending adjustment menu is automatically changed each time the user changes the position of the blending adjustment region or the position of the blending adjustment region and the number of blending adjustment regions.

3. A projection video display apparatus, comprising:
a projection optical system configured to project a projection video based on a video displayed by a display element;
an image processor; and
a controller, wherein
in order to combine the projection video with a projection video of another projection video display apparatus, the controller is configured to control the image processor to perform a blending process for partially changing brightnesses of the projection videos,
the controller is configured to perform control to set a mode of the projection video display apparatus to a blending adjustment mode in which a user adjusts the blending process performed by the image processor,
in the blending adjustment mode, the controller is configured to perform control to generate a menu image of the blending adjustment menu and display the menu image in the projection video,
in the blending adjustment mode, the controller automatically changes a display position of the blending adjustment menu according to a position of a blending adjustment region that is a region to be adjusted by the blending process,
the controller is configured to perform control to generate a second menu, which is displayed in a mode other than the blending adjustment mode, separately from the blending adjustment menu displayed in the blending adjustment mode and display the second menu in the projection video,
the display position of the second menu itself is set to a desired position through the second menu by user, and when transitioning from a state other than the blending adjustment mode to the blending adjustment mode, the controller automatically changes the display position of the blending adjustment menu according to the position of the blending adjustment region regardless of the desired position set by the user.

4. A projection typo video display apparatus, comprising:
a projection optical system configured to project a projection video based on a video displayed by a display element;
an image processor; and
a controller, wherein
in order to combine the projection video with a projection video of another projection video display apparatus, the controller is configured to control the image processor to perform a blending process for partially changing brightnesses of the projection videos,
the controller is configured to perform control to set a mode of the projection video display apparatus to a blending adjustment mode in which a user adjusts the blending process performed by the image processor,
in the blending adjustment mode, the controller is configured to perform control to generate a menu image of the blending adjustment menu and display the menu image in the projection video,
in the blending adjustment mode, the controller automatically changes a display position of the blending adjustment menu according to a position of a blending adjustment region that is a region to be adjusted by the blending process, and
the controller is configured to perform control to generate a second menu, which is displayed in a mode other than the blending adjustment mode, separately from the blending adjustment menu displayed in the blending adjustment mode and display the second menu in the projection video,
the display position of the second menu itself is set to a desired position through the second menu by user, and
when transitioning from a state other than the blending adjustment mode to the blending adjustment mode, the controller automatically changes the display position of the blending adjustment menu according to the position of the blending adjustment region regardless of the desired position set by the user, and
when the blending adjustment mode ends to transition to a state other than the blending adjustment mode, when displaying the second menu, the second menu is displayed at the desired position set by the user regardless of the display position of the blending adjustment menu in the blending adjustment mode.

5. A projection video display apparatus, comprising:
a projection optical system configured to project a projection video based on a video displayed by a display element;
an image processor; and
a controller, wherein
in order to combine the projection video with a projection video of another projection video display apparatus, the controller is configured to control the image processor to perform a blending process for partially changing brightnesses of the projection videos,
the controller is configured to perform control to set a mode of the projection typo video display apparatus to a blending adjustment mode in which a user adjusts the blending process performed by the image processor,
in the blending adjustment mode, the controller is configured to perform control to generate a menu image of the blending adjustment menu and display the menu image in the projection video, in the blending adjustment mode, the controller automatically changes a display position of the blending adjustment menu according to a position of a blending adjustment region that is a region to be adjusted by the blending process, and
in the blending adjustment mode, when the blending adjustment regions corresponding to at least two opposite sides of the four sides of the rectangle of the projection video are included in blending adjustment targets, the controller reduces a size of the blending adjustment menu, as compared with a case where only the blending adjustment region corresponding to one of the four sides of the rectangle of the projection video is a blending adjustment target, and displays the reduced blending adjustment menu.

6. A projection video display apparatus, comprising:
a projection optical system configured to project a projection video based on a video displayed by a display element;
an image processor; and
a controller, wherein
in order to combine the projection video with a projection video of another projection video display apparatus, the controller is configured to control the image processor to perform a blending process for partially changing brightnesses of the projection videos,
the controller is configured to perform control to set a mode of the projection video display apparatus to a blending adjustment mode in which a user adjusts the blending process performed by the image processor,
in the blending adjustment mode, the controller is configured to perform control to generate a menu image of the blending adjustment menu and display the menu image in the projection video,
in the blending adjustment mode, the controller automatically changes a display position of the blending adjustment menu according to a position of a blending adjustment region that is a region to be adjusted by the blending process,
a range of the blending adjustment region is configured to be set by the blending adjustment menu, and
in the blending adjustment mode, the display position of the blending adjustment menu is automatically changed in a direction further away from a settable range of the blending adjustment region than a center of the projection video.

7. The projection video display apparatus according to claim 6, wherein the settable range of the blending adjustment region is a position of the blending adjustment region along any of four sides of a rectangle of the projection video projected by the projection optical system and a width of the blending adjustment region from each side of the rectangle of the projection video toward the center.

* * * * *